US010615566B2

(12) United States Patent
Weiner et al.

(10) Patent No.: US 10,615,566 B2
(45) Date of Patent: Apr. 7, 2020

(54) MODE-LOCKED AND WAVELENGTH TUNABLE OPTICAL FREQUENCY COMB GENERATION THROUGH DYNAMIC CONTROL OF MICRORESONATORS

(71) Applicant: Purdue Research Foundation, West Lafayette, IN (US)

(72) Inventors: Andrew Marc Weiner, West Lafayette, IN (US); Minghao Qi, West Lafayette, IN (US); Xiaoxiao Xue, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 876 days.

(21) Appl. No.: 14/630,625

(22) Filed: Feb. 24, 2015

(65) Prior Publication Data
US 2018/0083414 A1     Mar. 22, 2018

Related U.S. Application Data

(60) Provisional application No. 61/943,517, filed on Feb. 24, 2014, provisional application No. 62/103,726, filed on Jan. 15, 2015.

(51) Int. Cl.
*H01S 3/11* (2006.01)
*H01S 3/102* (2006.01)
(Continued)

(52) U.S. Cl.
CPC .......... *H01S 3/1109* (2013.01); *G02F 1/0121* (2013.01); *H01S 3/005* (2013.01);
(Continued)

(58) Field of Classification Search
CPC ............. H01S 3/1109; H01S 3/094026; H01S 3/0092; H01S 3/107; H01S 3/1305;
(Continued)

(56) References Cited

U.S. PATENT DOCUMENTS

2003/0202555 A1 * 10/2003 Liu .......................... H01S 5/10
372/94
2005/0047780 A1 * 3/2005 Hoshida ................. H04B 10/67
398/33
(Continued)

FOREIGN PATENT DOCUMENTS

WO    WO 2014131425 A1 * 9/2014 ........... G02F 1/3513

OTHER PUBLICATIONS

Gentry, C. M., et al., Wide-band On-chip Four-Wave Mixing via Coupled Cavity Dispersion Compensation. SW3M.2.pdf, CLEO:2014 © 2014 OSA.
(Continued)

*Primary Examiner* — Yuanda Zhang
(74) *Attorney, Agent, or Firm* — Purdue Research Foundation

(57) ABSTRACT

A tunable optical comb generator having a source laser configured to generate a continuous wave (CW) light at a first wavelength; and a microresonator coupled to the source laser and configured to receive the CW light and generate an optical signal having a plurality of output wavelengths corresponding to the first wavelength. The generator includes a microresonator tuning device coupled to the microresonator and configured to tune the microresonator to compensate the microresonator for wavelength shifts. A control circuit is coupled to the microresonator tuning device and configured to generate a control signal to control the microresonator tuning device based on the optical signal. Multiple microresonators in the form of microrings may be included to tune the generator. A heater coupled to the microresonators may be used to adjust the microresonators.

24 Claims, 28 Drawing Sheets

(51) Int. Cl.
*H01S 3/094* (2006.01)
*H01S 3/091* (2006.01)
*H01S 3/13* (2006.01)
*H01S 3/107* (2006.01)
*H01S 3/00* (2006.01)
*G02F 1/01* (2006.01)

(52) U.S. Cl.
CPC ............ *H01S 3/0092* (2013.01); *H01S 3/094* (2013.01); *H01S 3/0912* (2013.01); *H01S 3/094026* (2013.01); *H01S 3/107* (2013.01); *H01S 3/1028* (2013.01); *H01S 3/1305* (2013.01); *G02F 2203/15* (2013.01); *G02F 2203/56* (2013.01); *H01S 3/0014* (2013.01); *H01S 3/0078* (2013.01)

(58) Field of Classification Search
CPC ...... H01S 3/1028; H01S 3/094; H01S 3/0912; H01S 3/0014; H01S 3/0078
See application file for complete search history.

(56) References Cited

U.S. PATENT DOCUMENTS

| | | | | |
|---|---|---|---|---|
| 2006/0268950 | A1* | 11/2006 | Kane | H01S 3/10092 372/30 |
| 2008/0112667 | A1* | 5/2008 | Hamann | G02B 6/12007 385/24 |
| 2013/0161496 | A1* | 6/2013 | Akiyama | G02F 1/0147 250/227.23 |
| 2015/0168803 | A1* | 6/2015 | Xu | G02F 1/353 359/332 |
| 2015/0380900 | A1* | 12/2015 | Liang | G02B 6/29341 385/2 |
| 2016/0011489 | A1* | 1/2016 | Herr | G02F 1/3513 385/2 |

OTHER PUBLICATIONS

Zeng, X. et al., Four-wave mixing in silicon "photonic molecule" resonators with port-selective, orthogonal supermode excitation. SW3M.3.pdf CLEO:2014 © 2014 OSA.

Gentry, C. M., et al., Tunable coupled-mode dispersion compensation and its application to on-chip resonant four-wave mixing. Optics Letters, vol. 39, 5689-5692 (2014).

Zeng, X., et al., Four-wave mixing in silicon coupled-cavity resonators with port-selective, orthogonal supermode excitation. Optics Letters / vol. 40, No. 9 / 2120-2123 (2015).

Okawachi, Y., et al., Spectrally Efficient Comb Source with Coupled Microresonators. SM2M.3.pdf CLEO:2015 © OSA 2015.

Miller, S. et al., Tunable frequency combs based on dual microring resonators. FThlD.5.pdf CLEO:2015 © OSA 2015.

Zhang, X., et al., Mid-infrared frequency comb generation in coupled silicon microring resonators. Optics Communications 332 (2014) 125-131.

Xue, X., et al., Normal-dispersion Microcombs Enabled by Controllable Mode Interactions. Laser & Photon. Rev., 9: L23-L28 (2015).

\* cited by examiner

MODE-LOCKED AND WAVELENGTH TUNABLE OPTICAL FREQUENCY COMB GENERATION THROUGH DYNAMIC CONTROL OF MICRORESONATORS

RELATED APPLICATIONS

The present application claims the benefit of U.S. provisional application Ser. No. 61/943,517, filed Feb. 24, 2014 and U.S. provisional application Ser. No. 62/103,726, filed Jan. 15, 2015. The contents of both of these applications are hereby incorporated by reference in their entirety.

STATEMENT REGARDING GOVERNMENT FUNDING

This invention was made with government support under W31P40-13-1-0018 awarded by the Defense Advanced Research Projects Agency, FA9550-12-1-0236 awarded by the Air Force Office of Scientific Research, and ECCS-1102110 awarded by the National Science Foundation. The government has certain rights in the invention.

TECHNICAL FIELD

The present disclosure relates to a mode-locked and wavelength tunable optical frequency comb generator, and a method of generating a mode-locked, low-noise Kerr comb and tuning the comb wavelength while maintaining the mode-locked state.

BACKGROUND

This section introduces aspects that may help facilitate a better understanding of the disclosure. Accordingly, these statements are to be read in this light and are not to be understood as admissions about what is or is not prior art.

An optical wavelength division multiplexing (WDM) technique can be implemented in order to use a single fiber to carry multiple optical channels at different WDM wavelengths. In order to increase the number of optical WDM channels carried by a fiber within a given spectral bandwidth, the frequency spacing between two adjacent WDM wavelengths must be reduced. However, as this frequency spacing reduces, the frequency spacing must be tightly controlled so that undesirable optical cross talk is avoided. If different lasers are used to generate different optical WDM channels, the lasers have to be controlled to avoid frequency drifts and fluctuations in the lasers.

One approach is to use a single laser with a comb generator. A mode locked comb laser can be used to produce a frequency comb with a plurality of regularly spaced frequency modes. Lasers which serve to generate an optical comb for use in, e.g., WDM systems, are known in the art.

The Optical frequency comb generator developed based on the Kerr effect in nonlinear microresonators is an attractive comb generator for its simplicity, small size, and potential of chip-level integration. For many applications, the tunability of the generated combs is required to perform some essential functions, such as aligning the comb lines with the channels in optical WDM communication systems, or achieving stabilization guided by self-referencing with an f-2f interferometer. One method of tuning, namely simply adjusting the pump frequency and utilizing the thermal self-locking effect, has been demonstrated for a fused silica microresonator. But generally combs are not expected to maintain a uniform low-noise state in the tuning process, because the intensity noise and coherence of Kerr combs sensitively depend on the phase detuning between the resonance and the pump frequency.

Another challenge with such comb generators is that the excitation wavelength of the source laser has to be tuned to the resonator. Such tuning circuits are complex. Therefore, there is an unmet need for a comb generator capable of producing a plurality of wavelengths while maintaining a match between the laser source wavelength and the desired output wavelengths of the resonator in an effective but simple fashion.

SUMMARY

According to one embodiment, a tunable optical comb generator is disclosed, comprising a source laser configured to generate a continuous wave (CW) light at a first wavelength, a microresonator coupled to the source laser and configured to receive the CW light and generate an optical signal having a plurality of output wavelengths corresponding to the first wavelength, a microresonator tuning device coupled to the microresonator and configured to tune the microresonator to compensate the microresonator for wavelength shifts, and a control circuit coupled to the microresonator tuning device and configured to generate a control signal to control the microresonator tuning device based on the optical signal. A heater may be coupled to the microresonator for use in adjusting the microresonator. The microresonator may optionally include a plurality of microrings having different radii or free spectral ranges. Comb mode locking may be achieved by keeping the first wavelength of the source laser fixed and the adjusting the control signal to cause the microresonator resonance to first shift to a second wavelength longer than the first wavelength and then shift back to the first wavelength.

BRIEF DESCRIPTION OF THE DRAWINGS

FIG. 2c illustrates an exemplary result of the transmission measured at the drop port of FIG. 2a.

FIG. 14 illustrates comb generation results using the microresonator of FIG. 13a.

DETAILED DESCRIPTION

Figure 1:
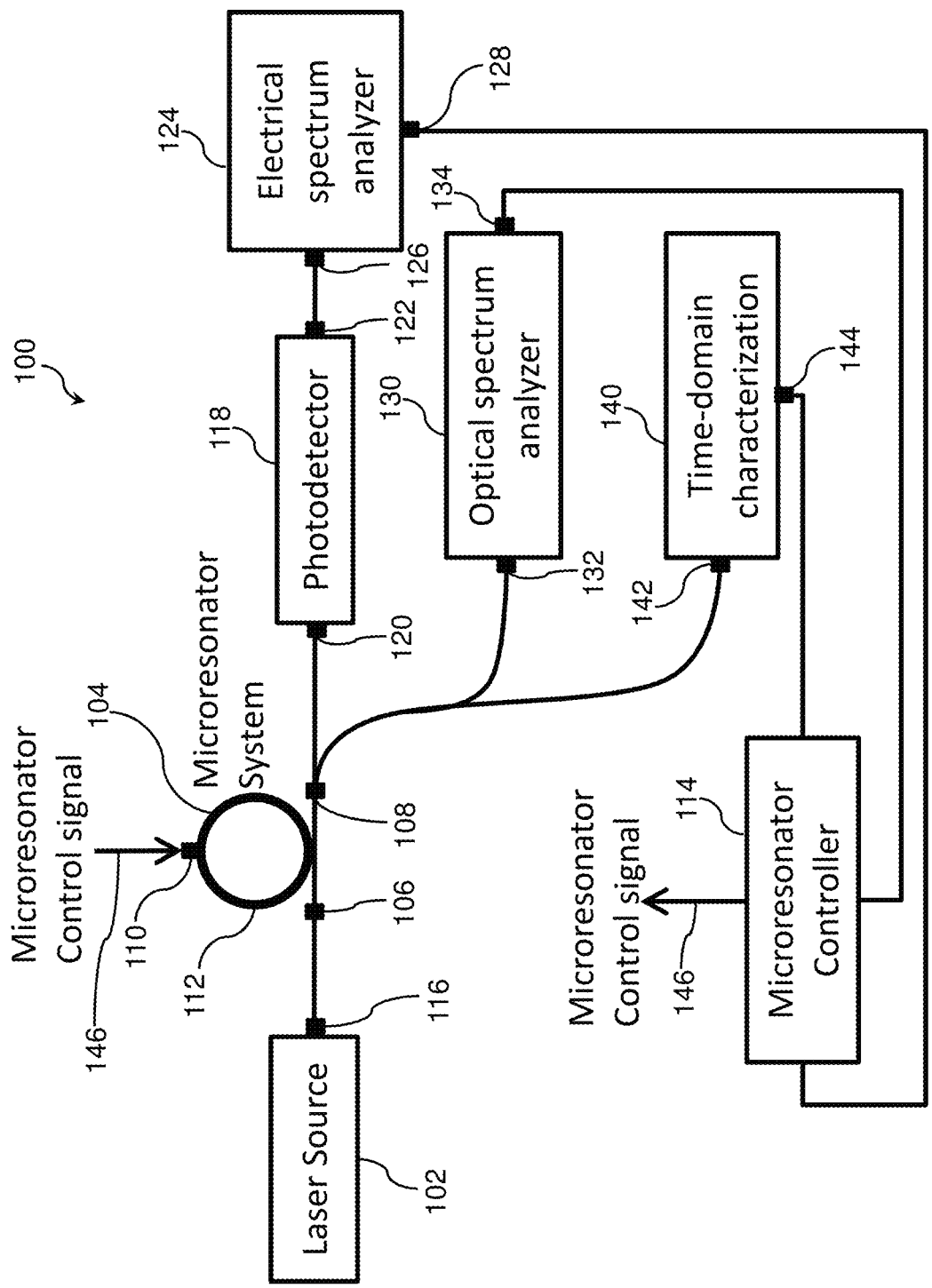
FIG. 1 illustrates a schematic diagram of a comb generation system according to one embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A novel comb generation and tuning scheme incorporating a thermal heater is described in the present disclosure. FIG. 1 depicts a schematic of an optical frequency comb generation system 100 according to the present disclosure incorporating a wavelength-fixed laser and a tunable microresonator system.

Referring to FIG. 1, the system 100 includes a laser source 102 and a microresonator controller 104. The microresonator system 104 an input 106, output 108 and a control line 110. The microresonator system 104 includes a microresonator 112 and a control system 114, described below, which controls the output of the microresonator 112. In one embodiment, the microresonator 112 may be a comb-style resonator. The laser source is optically coupled to the microresonator 112 by a coupling between the input 106 of the microresonator system and an output 116 of the laser. The laser source 102 is configured to provide a continuous wave (CW) light with a fixed center wavelength to the microresonator system 104 which is in turn configured to generate a plurality of wavelengths in relations to the input wavelength of the incoming laser. The system of FIG. 1 further includes a photodetector 118. The photodetector 118 is typically a transducer which converts a photonic signal to an electrical signal. It includes an input 120 and an output 122. The input 120 of the photodetector accepts a photonic signal and is coupled to the output 108 of the microresonator system. The system of FIG. 1 further includes an electrical signal spectrum analyzer 124 having input 126 and output 128. The input 126 is coupled to the output 122 of the photodetector 118. The photodetector 118 output is a time varying signal representative of the photonic signal that the photodetector 118 receives. The system of FIG. 1 further includes an optical spectrum analyzer 130 as well as a time-domain characterization system 140 used for identifying the optical characteristics of the photonic signals generated by the microresonator system 108. The inputs 132 and 142 are coupled to the output 108 of the microresonator system 104.

According to one embodiment, the resonant frequencies of the microresonator system 104 are dynamically controlled to overcome the resonance shifting caused by the thermal-optical effect and the Kerr effect when the laser 102 power is injected in the microresonator system 104. When the intracavity power exceeds the modulation instability threshold, new frequencies which equal the resonant frequencies of various modes of the microresonator system 104 appear. The frequency spectrum is further expanded through cascaded four-wave mixing in the microresonator 112. Two photons from the laser 102 are converted to two new photons with frequencies separated symmetrically with respect to the pump frequency through degenerated four-wave mixing, and the new photons will interact with each other through non-degenerated four-wave mixing to generate photons with more new frequencies. Eventually a broad comb is generated, as discussed in U.S. Pat. No. 7,982,944 to Kippenberg et al., which is herein incorporated by reference.

As discussed above, the output of the microresonator system is provided to three branches, although it should be understood that additional branches may be provided to provide output to additional applications. In the first branch, the intensity noise of the comb spectrum is monitored by using photodetector 118 to transduce the optical power envelope to an electrical signal and monitoring (manually or automatically) the electrical signal on electrical spectrum analyzer 124. In the second branch, the comb spectrum is monitored (automatically or manually) using optical spectrum analyzer 132. In the third branch, the amplitude and phase of each comb line is manipulated by using a pulse shaper and the autocorrelation trace of the optical field is measured after the pulse shaper using time-domain characterization system 144. The comb coherence can be probed and the time-domain waveform can be characterized through this approach. The entirety of the pulse shaper and the autocorrelation measurement system is identified as the time-domain characterization block in FIG. 1. The details of the time-domain characterization block are provided below.

The microresonator controller 114 is coupled to and receives its input from the outputs 128, 134, and 134 of the electrical signal analyzer/control system 124, the optical spectrum analyzer 130, and the time-domain characterization system 140, respectively. An output from each these three blocks is provided to the microresonator controller 114 which provides a control signal 146 to the microresonator system 104.

The frequency of the laser 102 chosen may depend on the specific application needs. For example, if the comb source is used as the optical carrier in a wavelength-division-multiplexing communication system, the frequency of the laser 102 equals the center frequency of one channel defined by corresponding International Telecommunication Union (ITU) Telecommunication Standardization Sector (ITU-T) standards. Accordingly, the microresonator 112 is controlled so that the free spectral range of the microresonator 112 should equal the channel spacing of the WDM grids.

The control signal 146 is applied to the microresonator system 104 to tune the resonant frequencies of the microresonator 112. One mode of the microresonator 112 is selected and tuned to overcome the resonance shifting caused by the thermal-optical effect and the Kerr effect when the pump laser 102 power is injected in the microresonator 112. This dynamic process of tuning the microresonator mode with respect to the pump laser frequency is needed for comb generation incorporating a wavelength-fixed pump laser, as further described below.

The tuning is needed since the resonant frequencies of the resonator 112 are red-shifted (red-shifting happens when wavelength of light emanating from an object and moving away from an observer increases, or red-shifted to the red end of the spectrum) towards lower values (frequency is inversely proportional to wavelength) because of the thermal-optical effect and the Kerr effect when a pump laser power is injected in the nonlinear microresonator 112. Because of the red-shifting effect, the microresonator 112 needs to be tuned according to its application. Even without the red shifting effect, the microresonator 112 (or the laser 102) needs to be tuned because the offset between the microresonator 112 and laser frequencies (frequency detuning) needs to be set to certain values to realize desired comb generation.

Figure 2A:
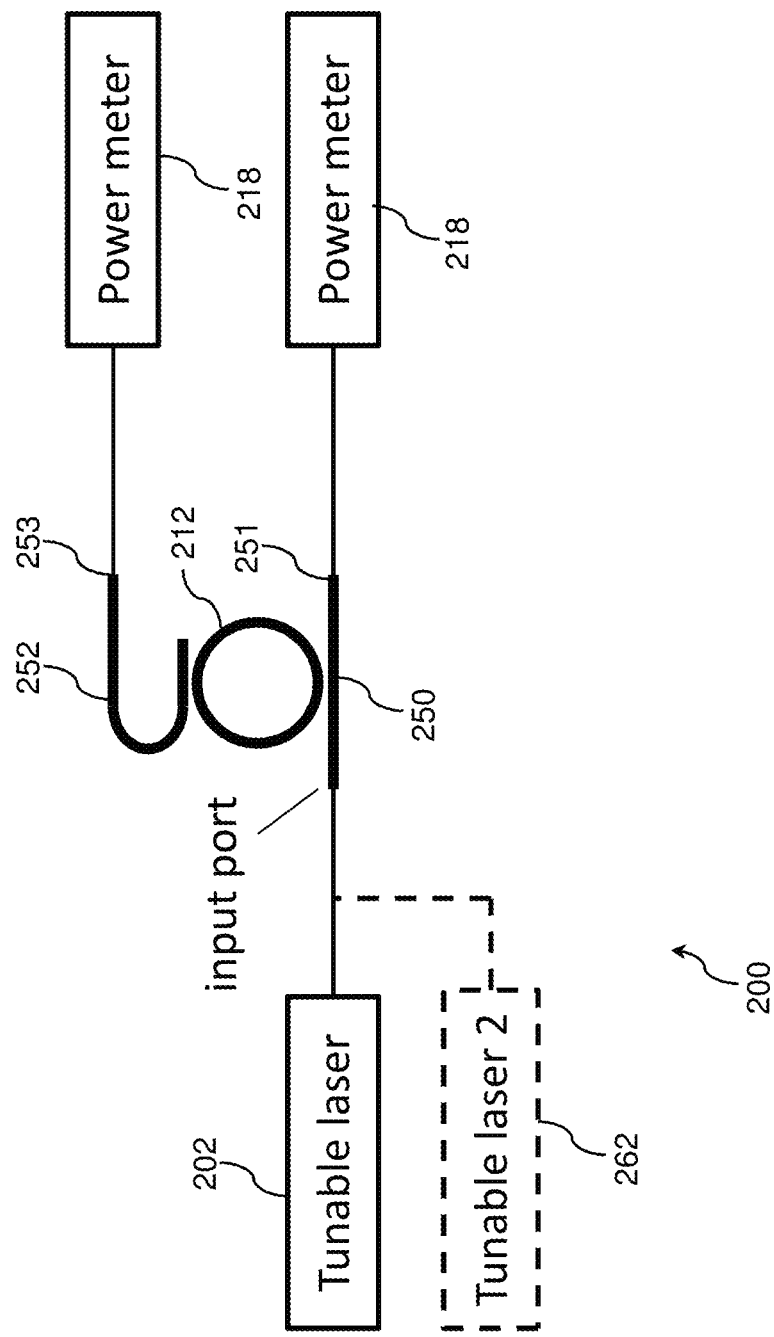
FIG. 2a illustrates a schematic diagram of a comb generation system having both a through port waveguide and a drop port waveguide.
Figure 2B:
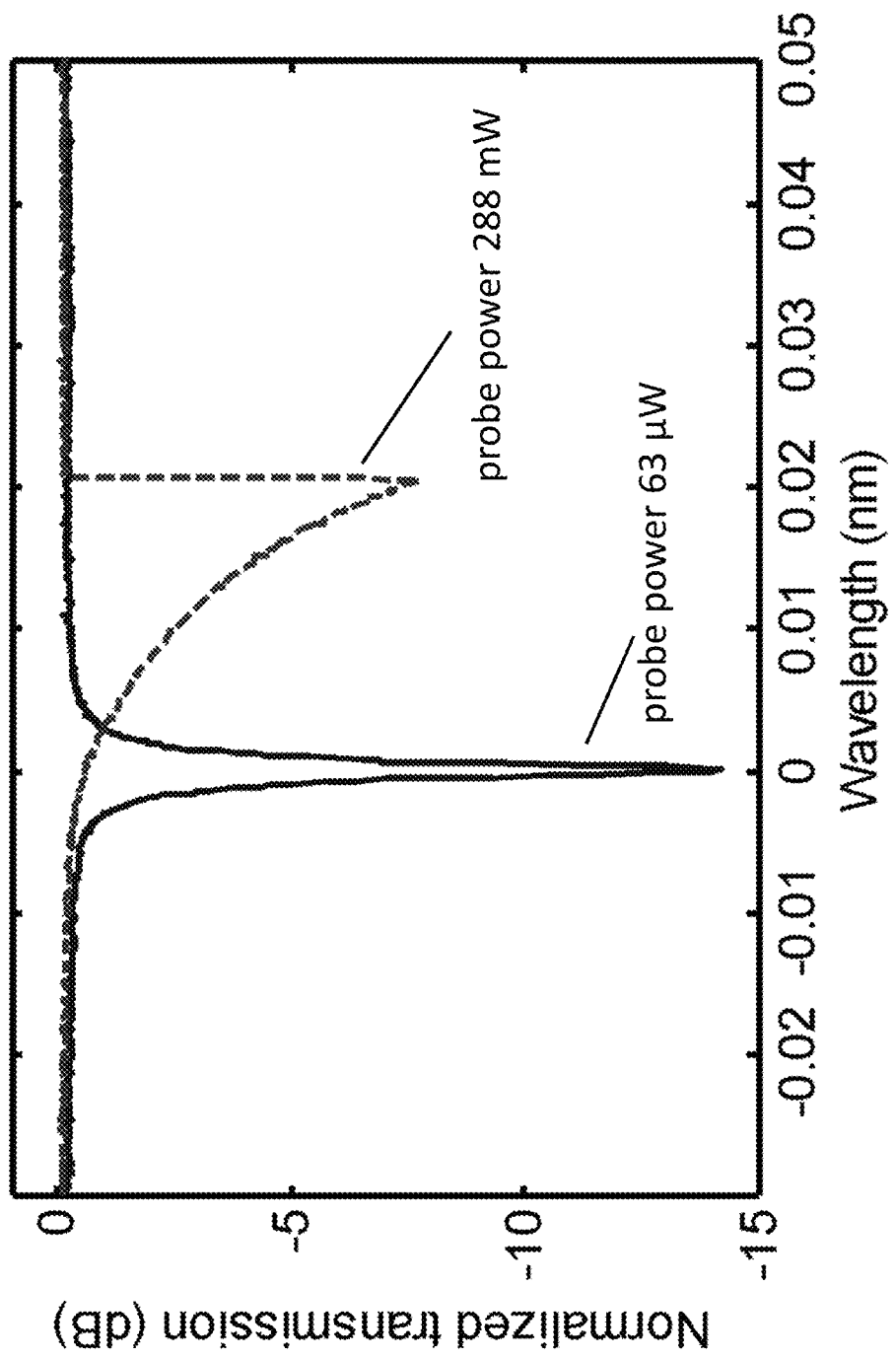
FIG. 2b illustrates an exemplary result measured by sweeping a pump laser frequency and recording the optical power at the through port.

The resonant frequencies of a microresonator can be retrieved by measuring the transmission of the microresonator. FIG. 2a shows a schematic 200 of an exemplary setup for measuring the transmission of a microresonator 212 having microring 213 and both a through port waveguide 250 and a drop port waveguide 252, in addition to laser 202, and power meters 218. FIG. 2b shows one exemplary result measured by sweeping the pump laser frequency and recording the optical power at the through port 251. The microring 213 can be made of silicon nitride, although other suitable materials may also be used. In one example the microring has a radius of 200 μm, and a loaded quality factor of $5.6 \times 10^5$. The horizontal axis of FIG. 2b is optical wavelength which is inverse of frequency. A symmetric resonance dip is clearly shown in the transmission curve when the probe laser power is low (63 μW in the example). The zero wavelength point which is center of the symmetric resonance corresponds to the resonant wavelength. When the laser probe power is increased to 288 mW, the resonance dip is distorted and shifted to a longer wavelength. The resonant wavelength in this case cannot be deduced from the high-power transmission. As the pump laser wavelength is getting close to the resonant wavelength, the optical field in the microresonator 212 starts to build up. Part of the optical energy is absorbed by the material comprising the microring 213, which generates heat and increases the temperature of the microring 213. The refractive index of the material is increased due to the temperature change. The optical Kerr nonlinearity also causes an increase of the refractive index with the increase of the intracavity optical power. As a result, the round-trip time of the microresonator 212 is increased corresponding to a red-shifting of the resonant wavelength. The red-shifted resonance wavelength can be measured by using a second low-power laser 262 (the dashed box in FIG. 2a) to probe a different mode of the microresonator 212 while keeping the first laser 202 injected to the first mode.

Figure 2C:
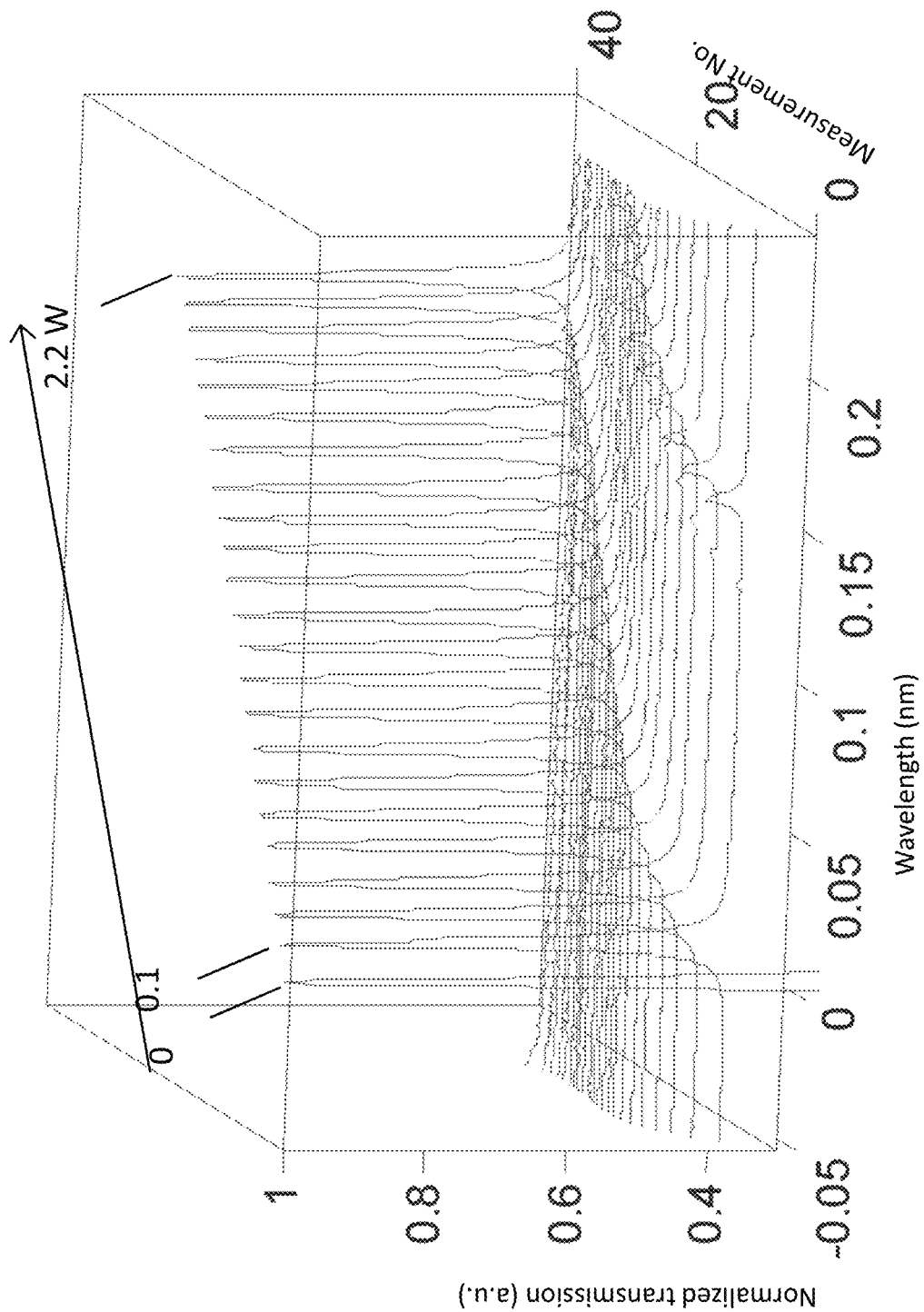

FIG. 2c shows one exemplary result of the transmission measured at the drop port 253 of the silicon nitride microring 213. When the first pump laser 202 power is increased from 0 W to 2.2 W, the resonant wavelength is shifted by 0.21 nm corresponding to a frequency shift of 26.3 GHz. This frequency shift is much larger than the bandwidth of the resonance which is 342 MHz in this example, and prevents the laser frequency from matching the resonant frequency of the microresonator 212. As a result, it is extremely challenging to steadily align the pump laser frequency with the resonator frequency for comb generation. In traditional microresonator-based optical frequency comb generation schemes, a dynamic tuning process of the pump laser frequency is essential to overcome the resonance shifting effect accompanying with laser power injection.

Figure 3A:
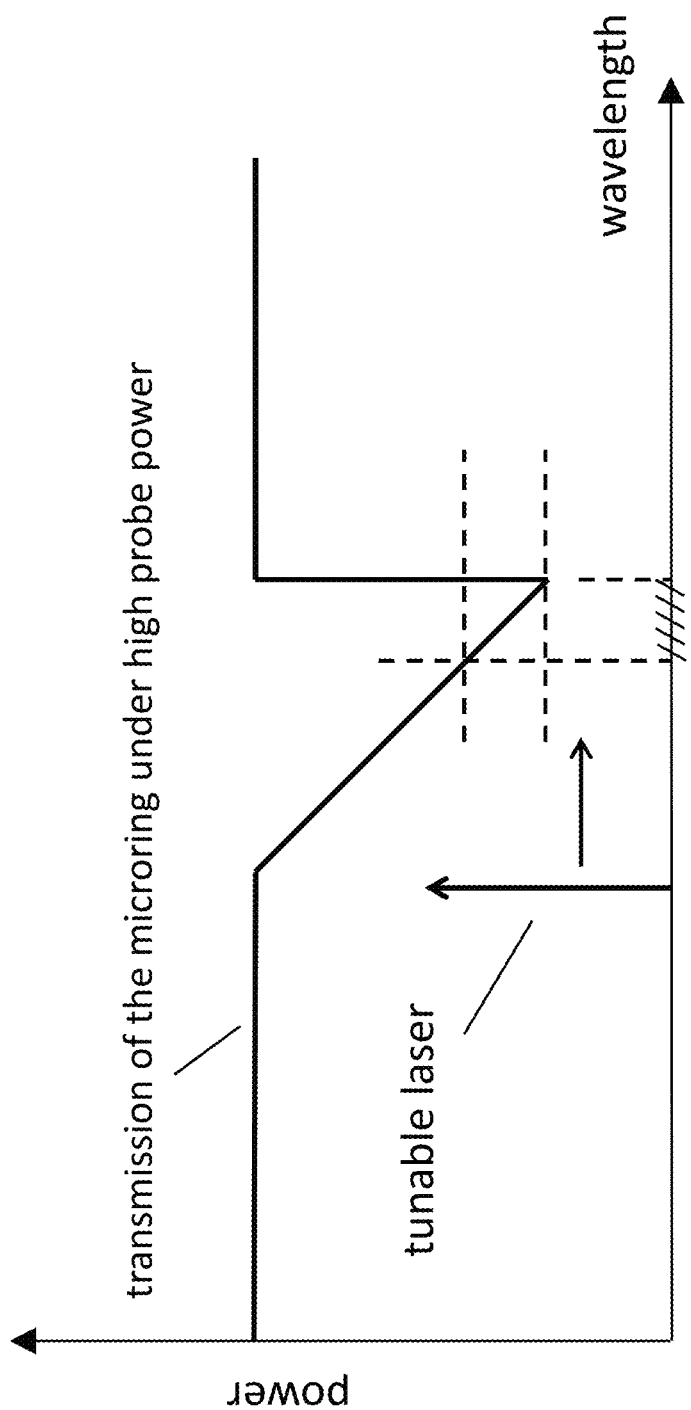
FIG. 3a illustrates the transmission of the through port of a microring resonator under a high probe laser power.
Figure 3B:
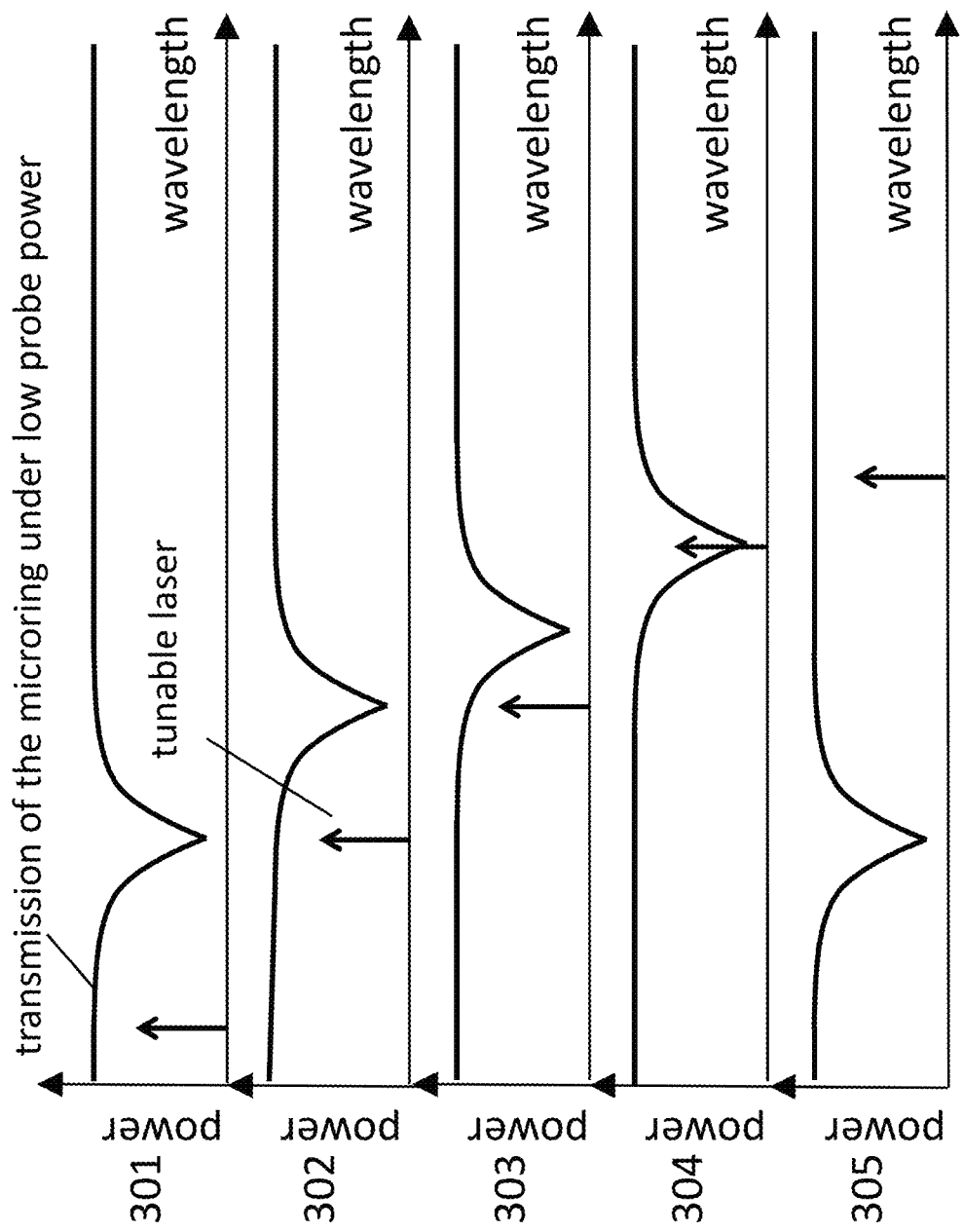
FIG. 3b illustrates the transmission of the through port of a microring resonator under low probe laser power.

An illustration is shown in FIG. 3a and FIG. 3b. FIG. 3a illustrates the transmission of the through port of a microring resonator, such as resonator 212, under a high probe laser power. FIG. 3b illustrates the transmission under a low probe laser power; subplots 301-305 illustrate the process of tuning the pump laser wavelength to match the resonant wavelength of the resonator. At the start, the pump laser (such as laser 102 or 202) wavelength is lower than the so called cold-state (no laser injection) resonant wavelength and is out of the resonant bandwidth. The pump laser power is hardly injected in the resonator at this stage. Then the pump laser wavelength is tuned closer to the resonant wavelength (subplot 302). Part of the laser power is injected in the resonator 212 and cause a resonance shift. The resonance shift reduces the power injection into the resonator. To further increase the injection, the pump laser wavelength needs to be tuned further to catch the resonance (subplot 303). This will cause a further resonance shifting. By keeping tuning the laser wavelength in this way, the pump laser wavelength can eventually closely match the resonant wavelength (subplot 304, corresponding to the hatched area in FIG. 3a). At this stage, the laser power is efficiently injected in the resonator which will facilitate optical frequency comb generation. If the pump laser wavelength is tuned further, the resonant wavelength will jump back to the cold-state value (subplot 305).

This resonance shifting effect accompanying with laser power injection makes it extremely difficult to generate combs based on a wavelength-fixed pump laser without dynamically controlling the microresonator. The present disclosure provides an advantageous and the novel scheme of tuning the resonator over traditional approaches for tuning lasers which are more complicated.

Figure 3C:
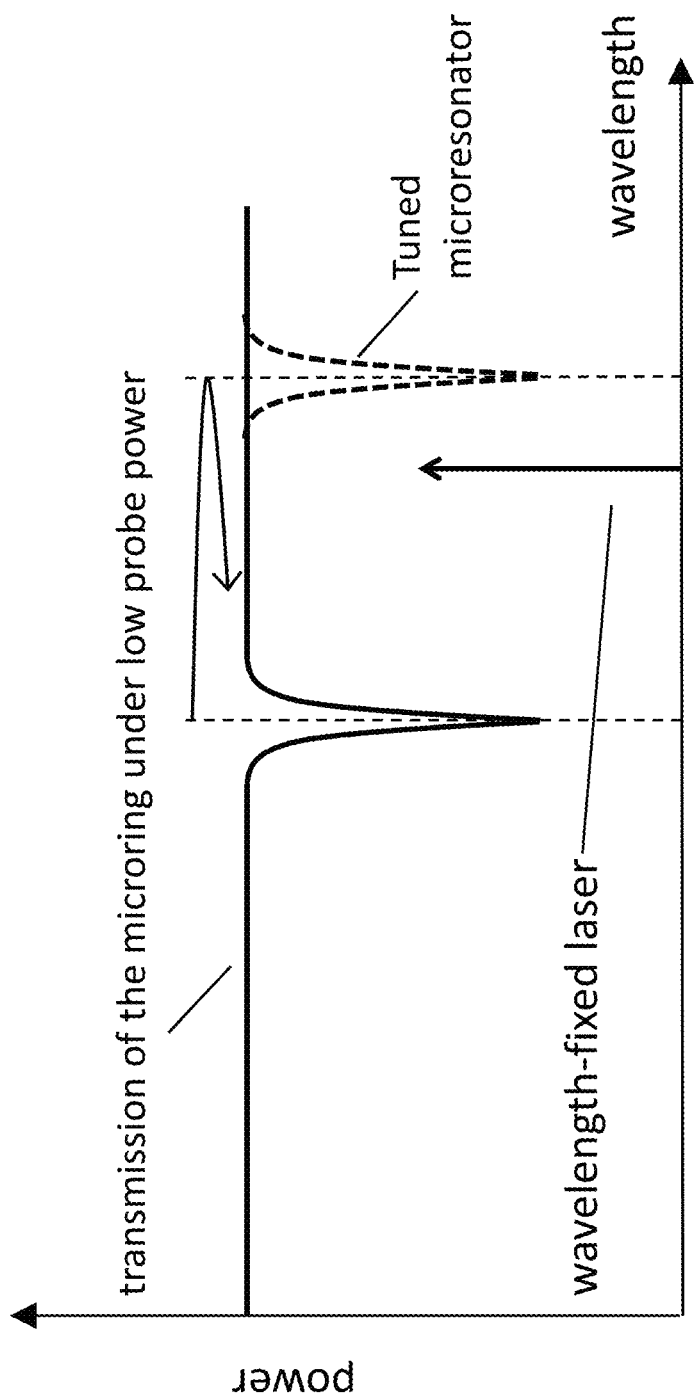
FIG. 3c illustrates a process for tuning a microresonator according to one embodiment.
Figure 3D:
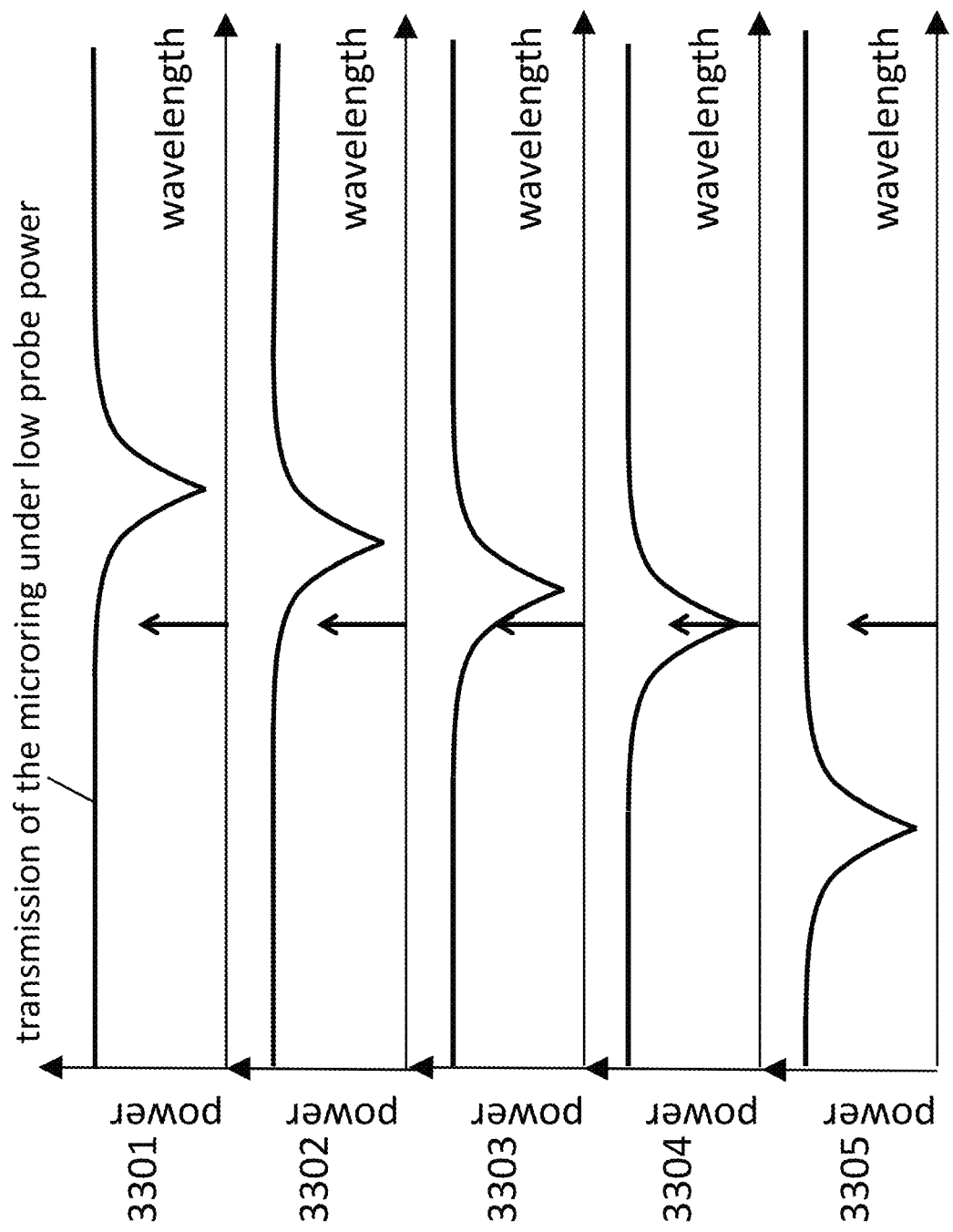
FIG. 3d illustrates a process for tuning a microresonator according to one embodiment.

FIGS. 3c and 3d explain how the microresonator (either 112 or 212) is tuned, according to the present disclosure. At the start, the resonant wavelength of the microresonator is tuned higher than the wavelength of the laser (subplot 3301). The resonant wavelength is then tuned closer to the laser wavelength (subplot 3302). Part of the laser power is injected to the resonator causing a resonance shift towards larger wavelength (not shown). The resonant wavelength is further tuned smaller to cancel the shift caused by laser injection (subplot 3303). In this process, the resonance shifting speed caused by the laser injection becomes lower than the shifting speed of intentional microresonator control as the laser wavelength is getting closer and closer to the resonant wavelength. By continuing to tune the resonator in this way, the resonant wavelength can eventually closely match the wavelength-fixed pump laser (subplot 3304). At this stage, the laser power is efficiently injected in the resonator which will facilitate optical frequency comb generation. If the resonant wavelength is further tuned smaller, the microresonator will jump back to the cold state (subplot 3305).

Figure 4A:
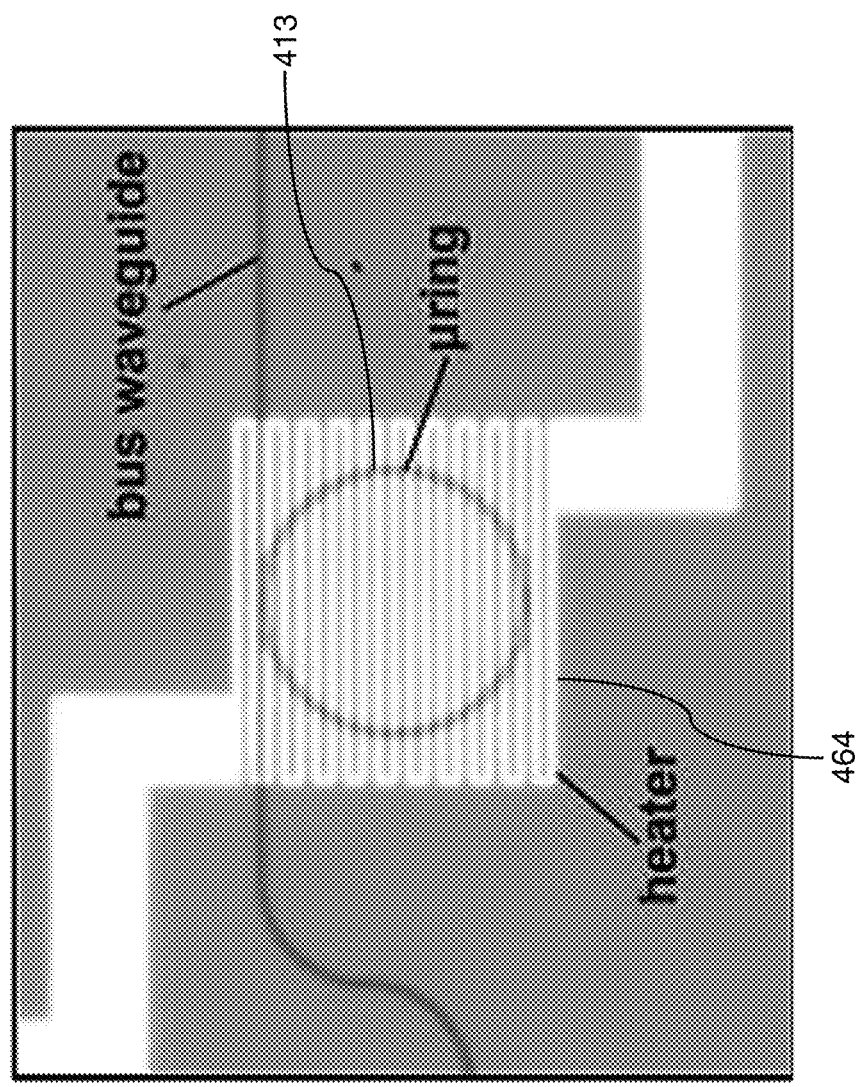
FIG. 4a illustrates a diagram of a microring with a microheater fabricated on a chip.

The microresonator (112 or 212) can be tuned by changing the temperature, mechanically squeezing the microresonator, or applying an electrical field to the microresonator if the microresonator is made of electro-optical materials. One exemplary embodiment is using a heater to change the temperature of the microresonator. A microscope image of a microring 413 with a microheater 464 fabricated on a single chip is shown in FIG. 4a. In one embodiment, the microring may be made of silicon nitride. The microring radius is 100 µm in one example, although larger or smaller radii may be used. The waveguide cross-section dimension is 2 µm×550 nm which corresponds to a normal dispersion regime. The microheater 464 is made of Au (gold) and coupled to the microring 413. In one embodiment, the microheater 464 is formed on top of the microring 413 as shown. In one embodiment, a 3.5-µm SiO2 layer is deposited between the silicon nitride layer and the metal layer to avoid absorption loss.

The microring controllable with a microheater is demonstrated by a CMOS-compatible fabrication technique, which advantageously provides for chip-level integration to implement an ultra-compact optical frequency comb generator.

Figure 4B:
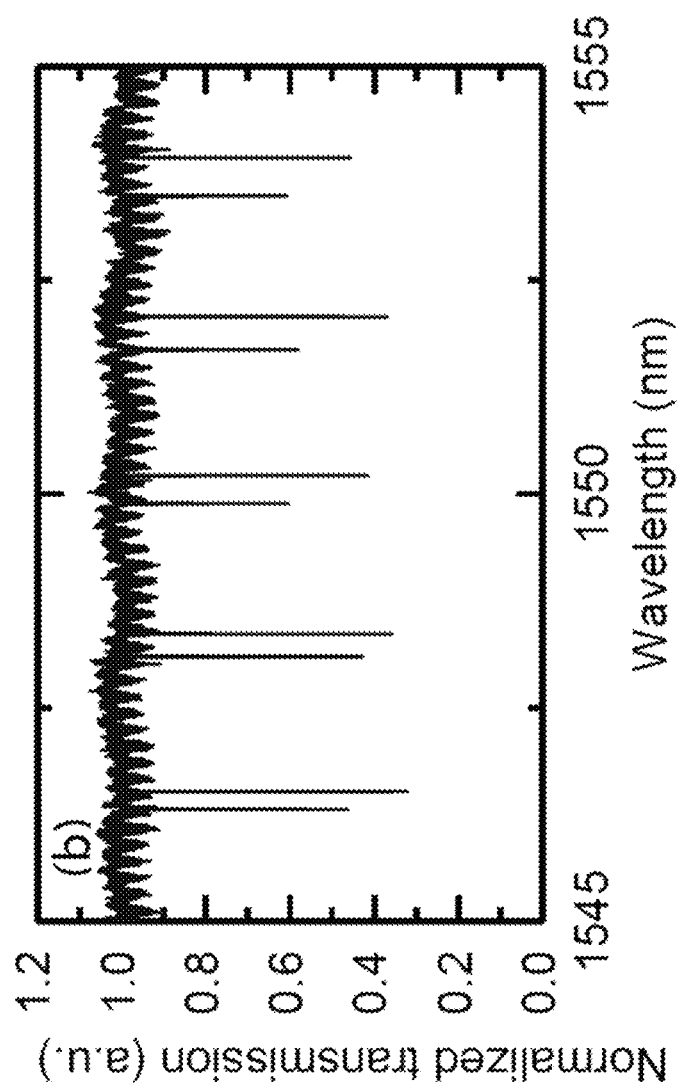
FIG. 4b illustrates a normalized transmission a microring in the 1545-1555 range.
Figure 4C:
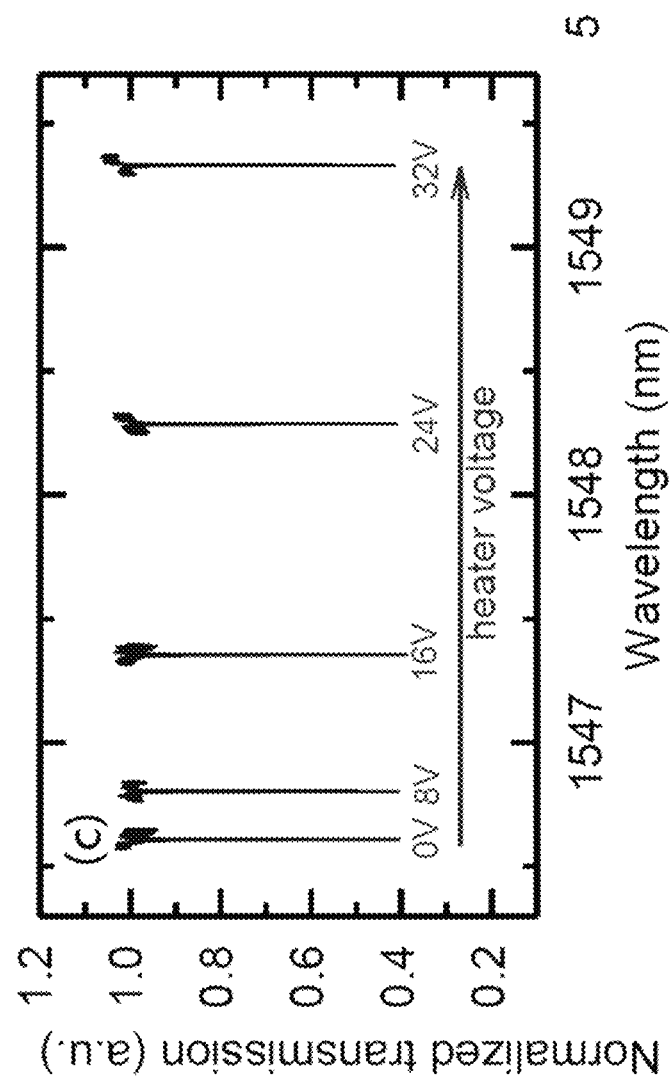
FIG. 4c shows a graph of the normalized transmission vs. wavelength for one resonance shifted by varying heater voltage.
Figure 4D:
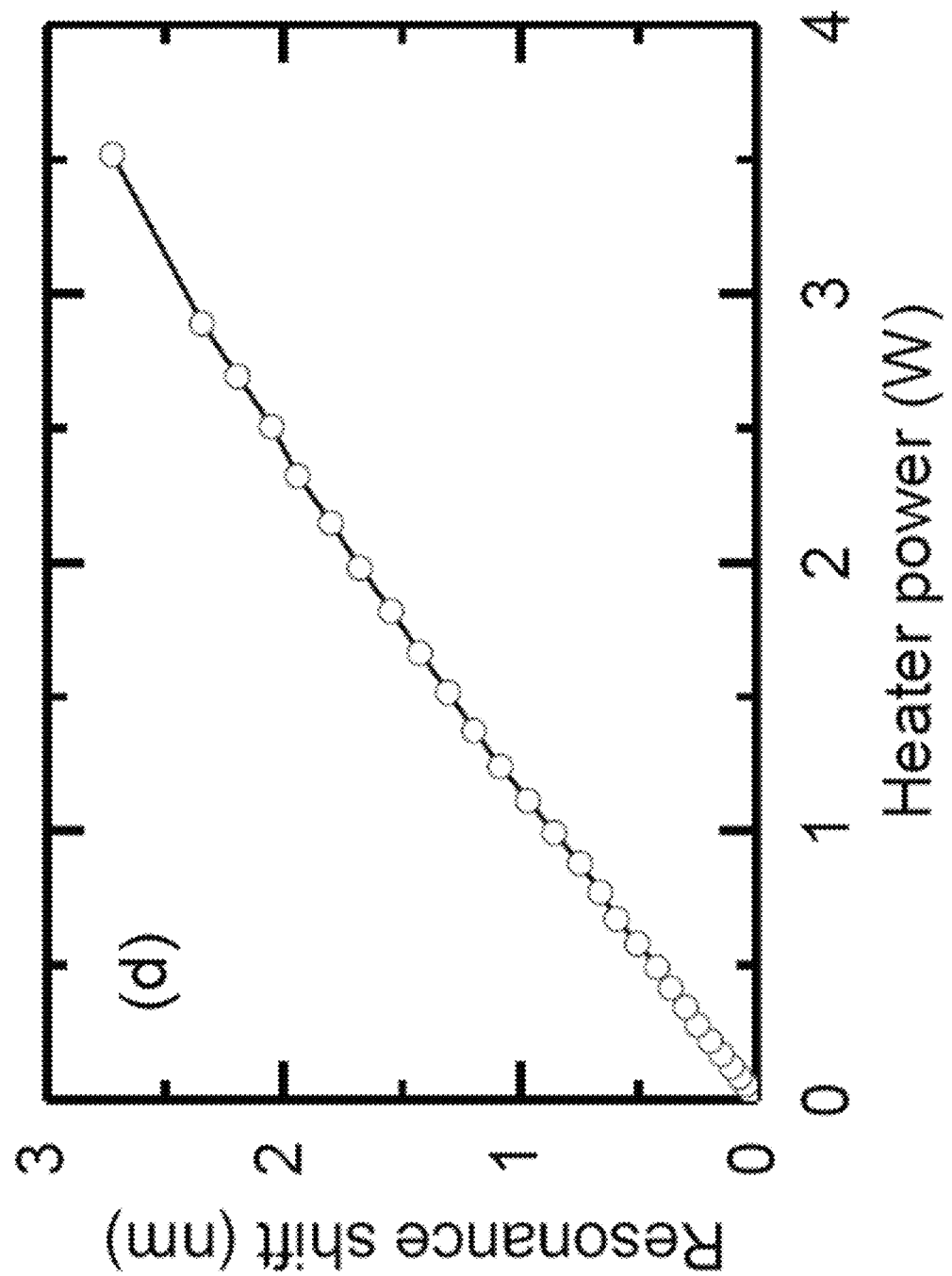
FIG. 4d shows a graph of resonance shift measured vs. heater power.

In the embodiment where the microresonator is controlled thermally, the microring resonance can be red-shifted by increasing the voltage applied to the microheater due to the thermal-optic effect. The normalized transmission of the microring 413 in the 1545-1555 nm range, in an exemplary embodiment, is shown in FIG. 4b. There are two mode families, and the one with higher quality factor ($Q_{Loaded}$=7× $10^5$) is used for comb generation. The free spectral range of this mode is 1.85 nm. FIG. 4c shows a graph of the normalized transmission vs. wavelength measured in nm for one resonance shifted by varying the heater voltage. FIG. 4d shows a graph of resonance shift measured in nm vs. the heater power measured in watts. In one embodiment, the heater resistance is 291 ohm. The resonance can be shifted by one free spectral range when the heater power is 2.2 W (corresponding to a voltage of 25.5 V).

Figure 5:
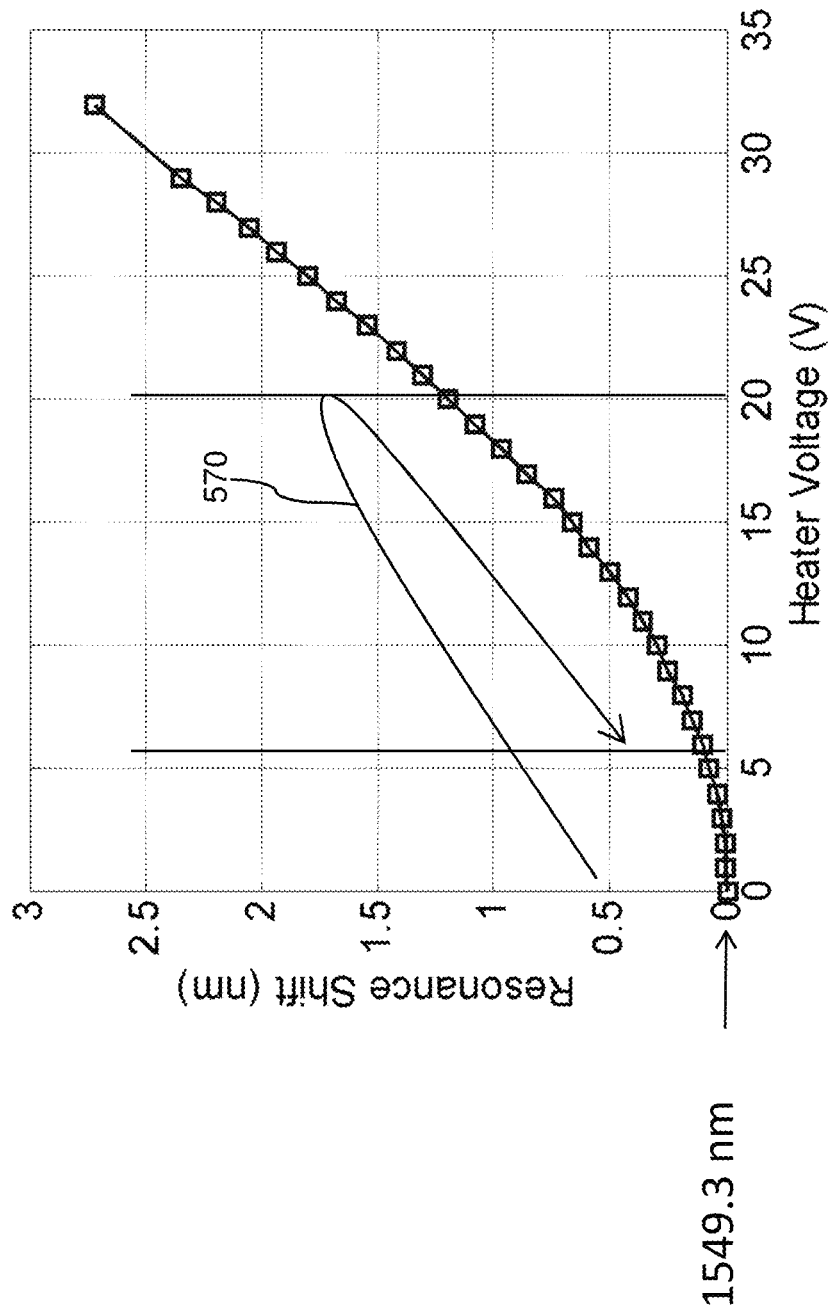
FIG. 5 is a graph showing heater voltage control for comb generation according to one embodiment.
Figure 6:
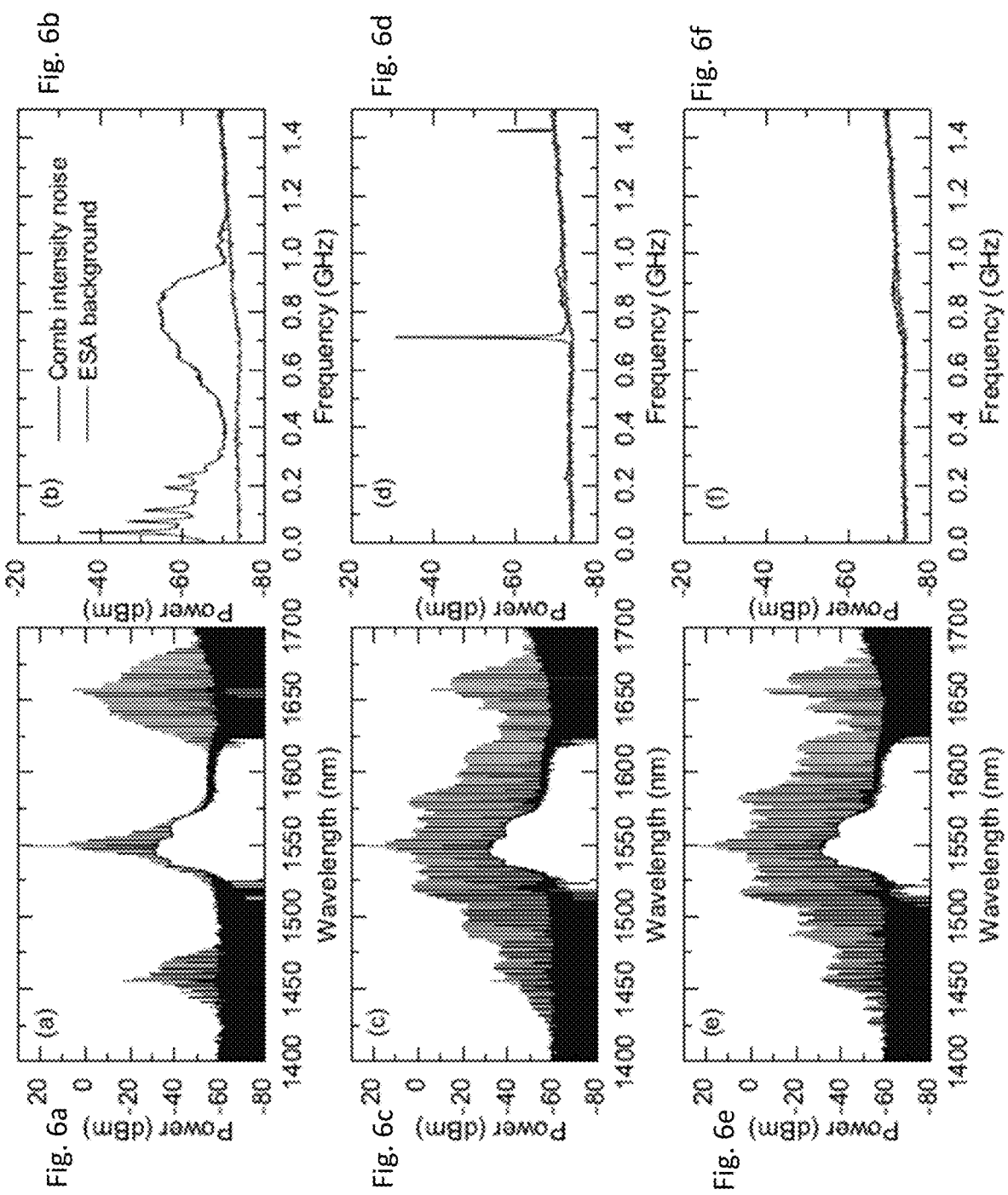
FIG. 6a illustrates comb spectra at a first stage of heater control according to one embodiment.
FIG. 6b illustrates intensity noise spectra at the first stage of heater control according to one embodiment.
FIG. 6c illustrates comb spectra at a second stage of heater control according to one embodiment.
FIG. 6d illustrates intensity noise spectra at the second stage of heater control according to one embodiment.
FIG. 6e illustrates comb spectra at a third stage of heater control according to one embodiment.
FIG. 6f illustrates intensity noise spectra at the third stage of heater control according to one embodiment.

In an exemplary embodiment of comb generation using a wavelength-fixed laser (such as laser 102 or 202) and a microring (such as microring 213 or 413) with heater 464, the pump laser wavelength is fixed at 1549.3 nm. The resonance mode centered at 1548.365 nm is chosen for comb generation. FIG. 5 shows the resonance shift vs. the heater voltage; and the arrow line 570 illustrates the way the heater voltage is controlled for comb generation. The heater voltage is first increased from 0 V to 20 V and then slowly reduced backwards. A series of comb spectra and corresponding intensity noise spectra at different stages of heater control are shown in FIGS. 6a-6f. The pump laser power is 1.7 W. When the heater is reduced to 7.95 V, three clusters of comb lines are generated as shown in FIG. 6a. One cluster is located around the pump laser wavelength; the other two are ~100 nm away. A high intensity noise 602 can be observed at this stage as shown in FIG. 6b. When the heater voltage is further reduced to 7.73 V, the comb spectrum is broadened as shown in FIG. 6c. More comb lines are generated. The comb intensity noise turns to several high narrow peaks 604 at some frequencies as shown in FIG. 6d. When the heater voltage is reduced further to 7.34 V. The comb spectrum shown in FIG. 6e does not change too much compared to that shown in FIG. 6c. However, the comb intensity noise 606 drops at this stage as shown in FIG. 6f. This low-noise transition generally indicates that the comb transitions to a mode-locked and highly coherent state. If the heater voltage is further reduced, the resonance will jump back to cold state and the comb will disappear. So to maintain a broad and low-noise comb, the heater voltage is kept 7.34 V after the dynamic tuning process.

In other exemplary embodiments, the pump laser power also needs to be controlled to facilitate the low-noise transition. For example, a similar comb spectrum as shown in FIG. 6c can be observed when the heater voltage is reduced from 20 V to 6.65 V and the pump laser power is 1.79 W; the comb then transitions to a low-noise state when the heater voltage is increased back to 7.26 V and the pump laser power is reduced to 1.37 W.

Figure 7:
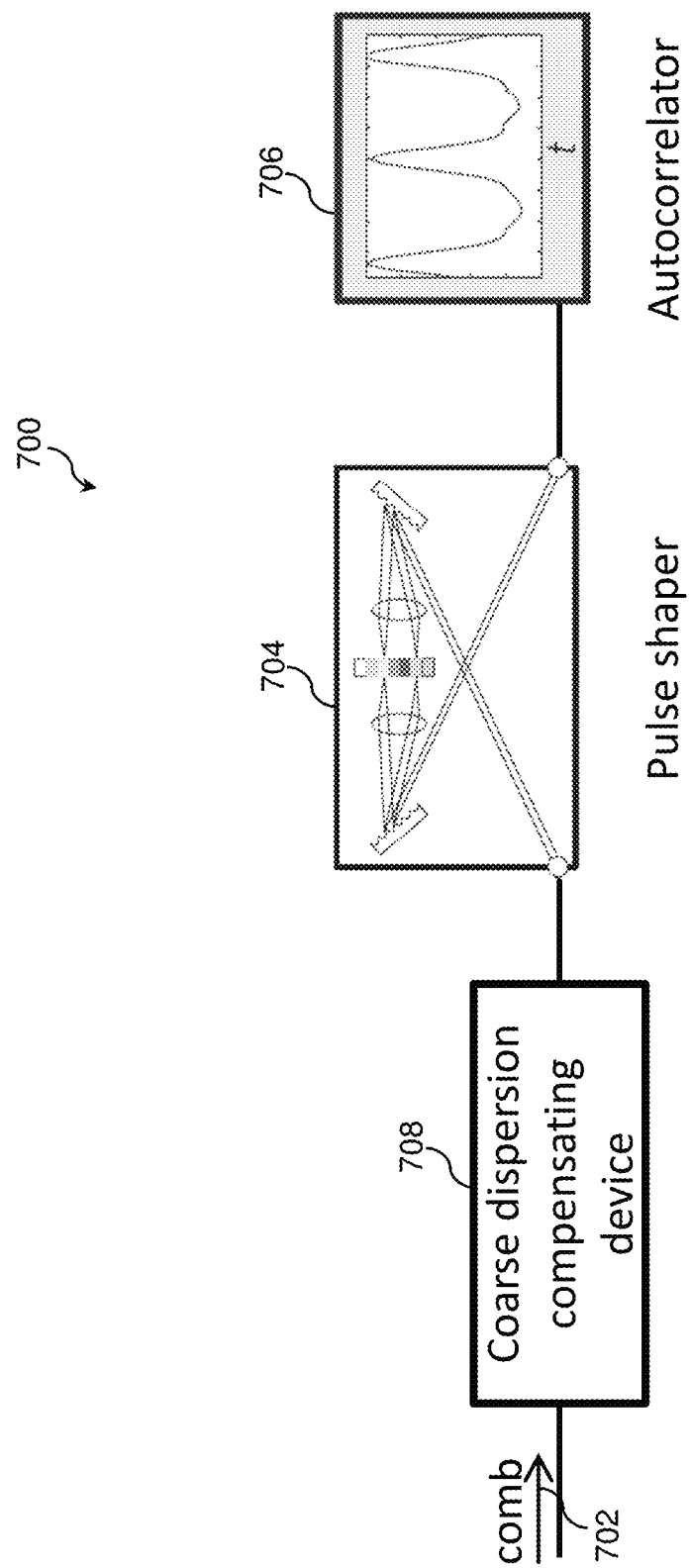
FIG. 7 illustrates a schematic diagram of a time-domain characterization for comb generation according to one embodiment.

The time-domain characteristic of the low-noise comb as shown in FIG. 6e is measured, and the coherence is probed through line-by-line shaping. An example arrangement 700 for time-domain characterization (e.g., time-domain characterization 140) is shown in FIG. 7. The comb 702 is sent to a pulse shaper 704 in which the comb frequencies are separated and phase adjusted line by line. The amplitude of each comb frequency can also be tailored to a smoother shape through the pulse shaper 704. The comb after the pulse shaper 704 is sent to an autocorrelator 706 to measure the time-domain autocorrelation. The phase of each comb frequency is adjusted in such a way that they are synchronous at the input of the autocorrelator. A coarse dispersion-compensating device 708, which may be a length of dispersion-compensating fiber, a chirped fiber Bragg grating, etc., is also inserted to roughly compensate the dispersion of the single-mode fiber from the output port the microresonator (e.g. 112 or 212 to the input of the autocorrelator. The pulse shaper 704 can be programmed to finely compensate the residual dispersion in the link.

By programming the pulse shaper 704 to make the phase of each comb line synchronous at the input of the autocorrelator and then measuring the time-domain autocorrelation, the coherence of the comb can be probed.

By programming the pulse shaper 704 to compensate the link dispersion and then measure the time-domain correlation, the time-domain waveform of the optical field in the microresonator can be characterized.

By first compensating the link dispersion and then synchronizing the comb phase, the phase of each comb line can be measured. In this case, the phase of each comb line is opposite to the corresponding phase applied by the pulse shaper 704 to synchronize the comb phase.

Figure 8A:
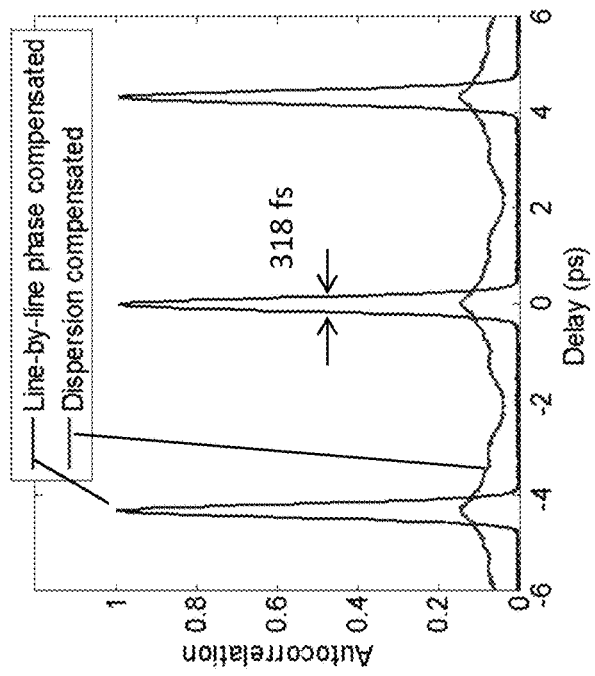
FIG. 8a illustrates shaped comb spectrum according to one embodiment.
Figure 8B:
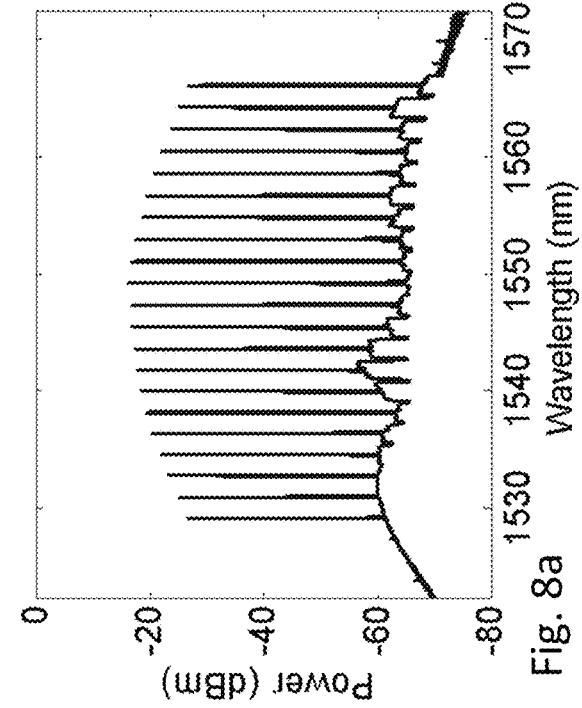
FIG. 8b illustrates measured autocorrelation traces when the phase of each comb line is synchronous and when the dispersion is compensated.
Figure 8C:
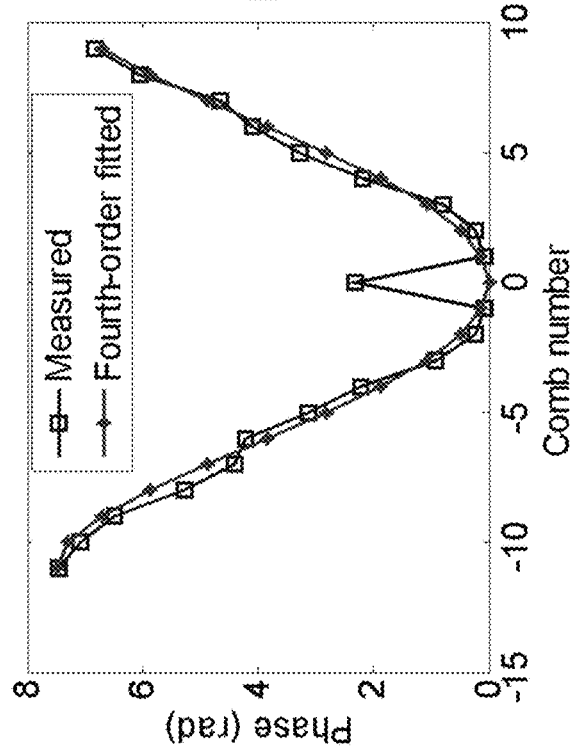
FIG. 8c illustrates the retrieved phase for lines from FIGS. 8a and 8b.

In an exemplary embodiment, the time-domain characterization results are shown in FIG. 8a-8c. FIG. 8a shows the shaped comb spectrum after the pulse shaper 704. Twenty one comb lines are selected and shaped to a Gaussian window. FIG. 8b shows the measured autocorrelation traces when the phase of each comb line is synchronous and when the dispersion is compensated. The autocorrelation trace when the phase of each comb line is synchronous agrees with an ideal transform-limited pulse, which implies a high coherence of the comb. The highly coherent state corresponds to a mode-locked state. The autocorrelation trace when the dispersion is compensated is quite different from an ideal transform-limited pulse, which implies that the waveform in the microresonator is chirped. FIG. 8c shows the retrieved phase of each line. A chirped phase curve which fits a fourth-order function can be clearly observed.

According to another exemplary embodiment, if a wavelength tunable pump laser is used for comb generation, the low-noise and mode-locked comb can be tuned once it is generated through dynamic control of the microresonator. In the comb frequency tuning process, the frequency detuning can be maintained by cooperatively tuning the pump laser frequency and the microresonator frequency, thus the low-noise and mode-locked property of the comb can be always achieved for each comb frequency.

One method of tuning, namely simply adjusting the pump frequency without controlling the microresonator and utilizing the thermal self-locking effect, has been demonstrated for a fused silica microresonator. However, generally, combs are not expected to maintain a uniform low-noise state in the tuning process, because the intensity noise and coherence of Kerr combs sensitively depend on the phase detuning between the resonance and the pump frequency.

For tunable comb generation, compared to prior art methods, one significant advantage of the novel technique disclosed herein is that the properties of comb including the spectral shape, intensity noise, and coherence can be maintained in the tuning process.

Figure 9:
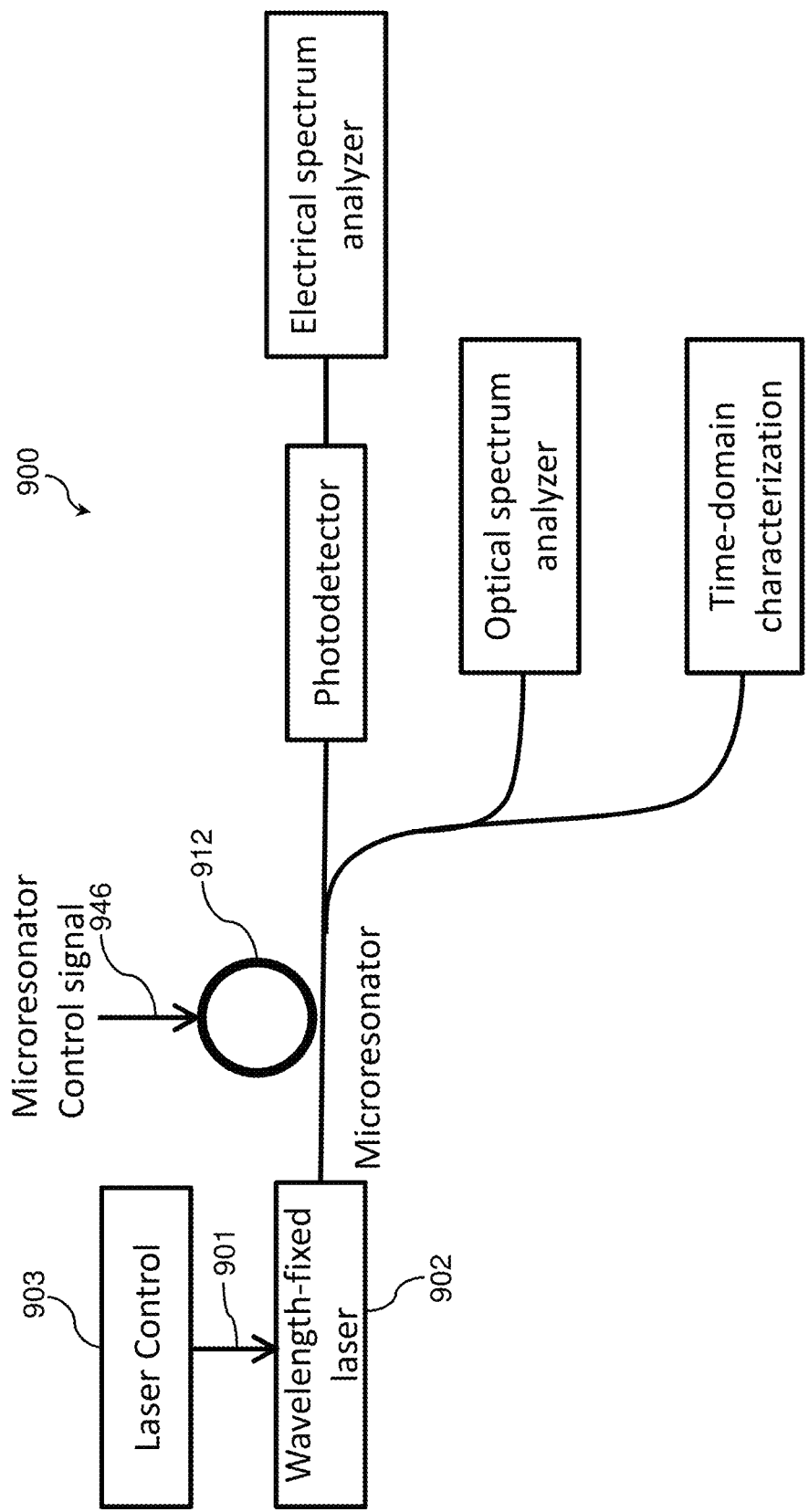
FIG. 9 illustrates a schematic diagram of a wavelength tunable comb generation system according to one embodiment.

A schematic arrangement 900 for wavelength tunable comb generation is shown in FIG. 9. The control signal 901 applied to the pump laser 902 controls the laser power and frequency. The control signal 946 applied to the microresonator 912 (which includes a microheater as discussed above) tunes the resonance. The microresonator controller (depicted in FIG. 1) is not shown in FIG. 9 but shall be understood to be connected to the microresonator 912 in a similar fashion as shown in FIG. 1. Further, a laser controller 903 for generating the laser control signal 901 is included in the arrangement 900 and operatively connected to laser 902 and provide control signal 901 to laser 902.

Figure 10:
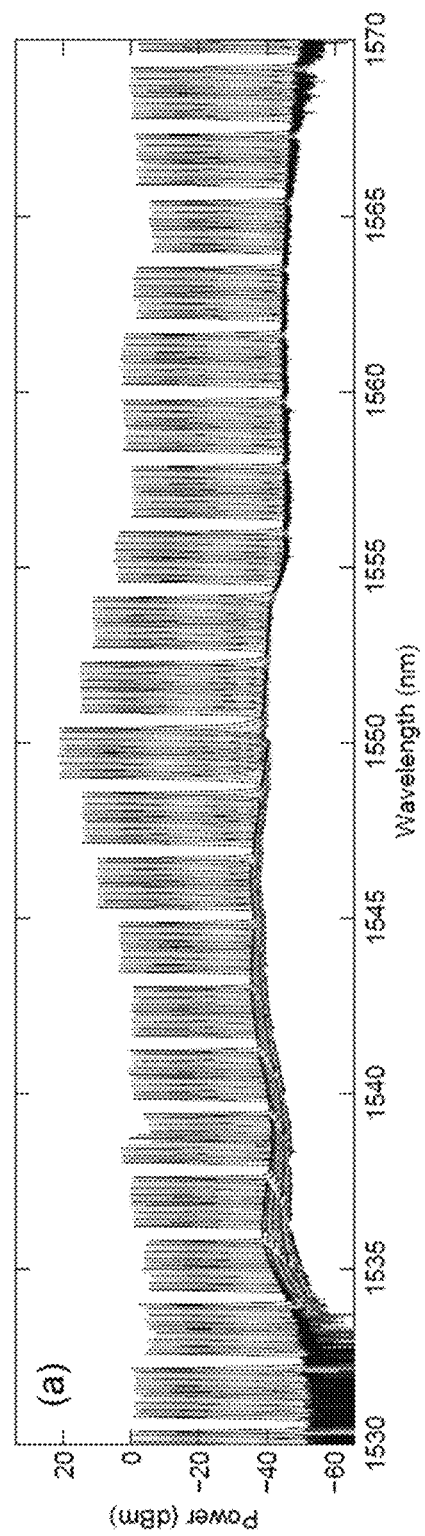
FIG. 10 illustrates tunable comb spectra when the pump wavelength is tuned from 1549 nm to 1550.4 nm.

In an exemplary embodiment, by changing the heater voltage (of a heater such as heater 464 when coupled to the microresonator 912) and the pump frequency in tandem, the spectrum of the mode-locked and low-noise comb can be continuously tuned. To tune the comb frequency, either the pump laser 902 frequency or the microresonator 912 can be tuned first, and then the other is tuned to catch the first. The frequency step of each tuning should be controlled in a small range so that the microresonator does not jump back to the cold state as illustrated in FIGS. 3b and 3d. When either the pump laser 902 or the microresonator 912 is tuned first, the low-noise comb may transitions back to a high-noise state, but it can transition to a low-noise state again by controlling the microresonator 912 or the pump laser 902. FIG. 10 shows the tunable comb spectra when the pump wavelength is tuned from 1549 nm to 1550.4 nm with a step of 0.1 nm. The comb keeps a nearly identical spectral shape in the tuning process. The demonstrated tuning range is 1.4 nm.

Figure 11A:
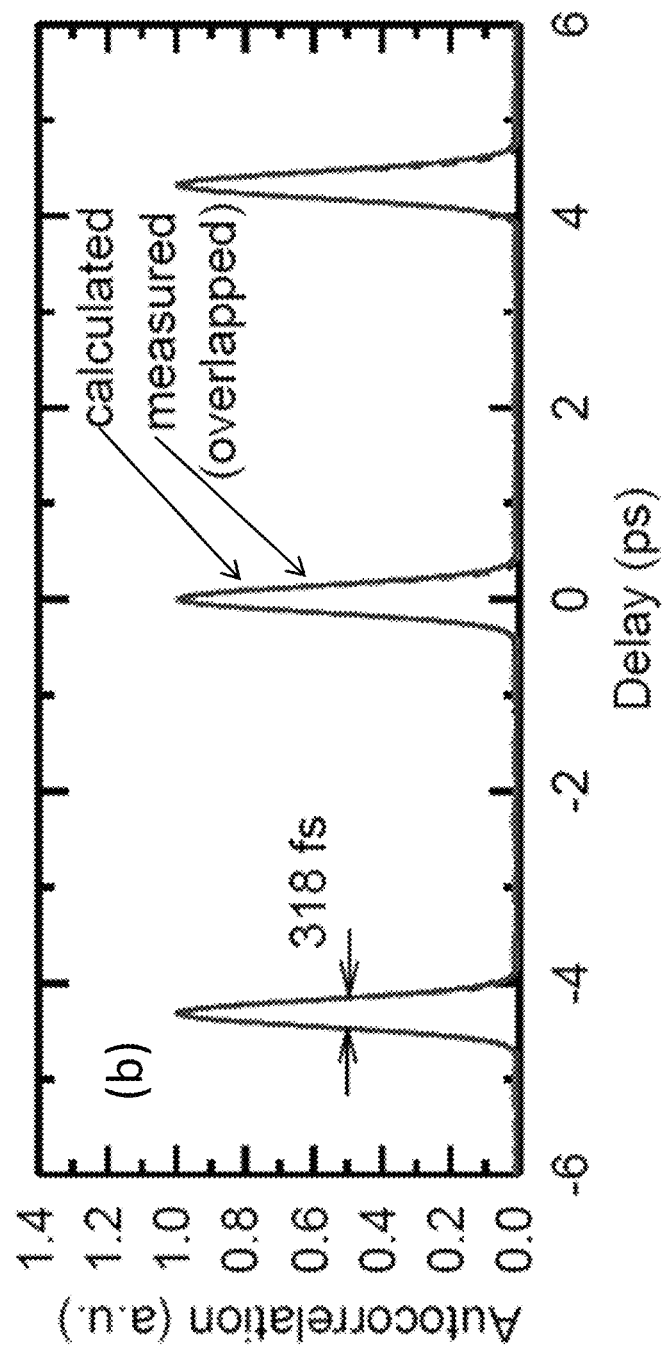
FIG. 11a illustrates measured autocorrelation traces of tunable combs after line-by-line shaping.

The autocorrelation traces of each comb with different wavelength are measured. FIG. 11a shows measured autocorrelation traces of the tunable combs after line-by-line shaping; each corresponding to one comb with a different pump wavelength. All the autocorrelation traces agree quite well with the theoretical result which is calculated by assuming perfect phase compensation. The autocorrelation width is 318 fs in full-width-at-half-maximum (FWHM), which implies an intensity width of ~200 fs FWHM.

Figure 11B:
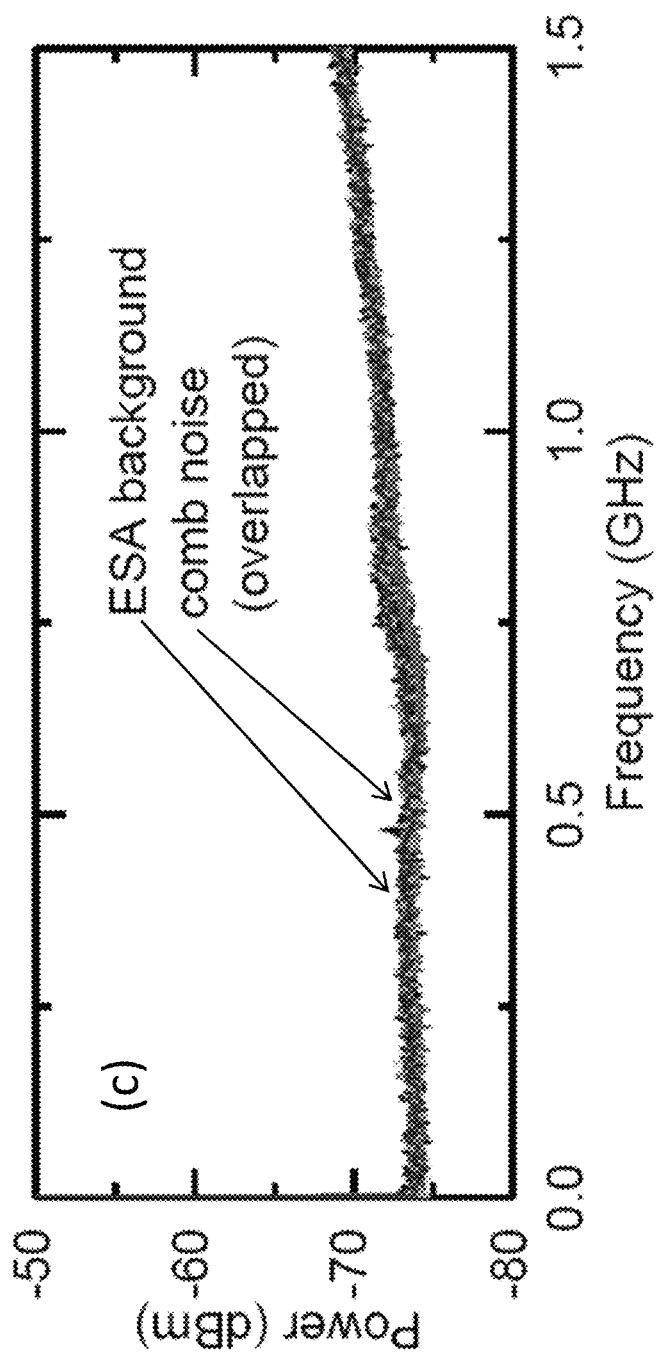
FIG. 11b illustrates comb intensity noise spectra according to one embodiment.

FIG. 11b shows the comb intensity noise spectra which approach the sensitivity of the electrical spectrum analyzer.

Both the autocorrelation results and the intensity noise imply that the wavelength tunable combs maintained high coherence, which is a unique advantage of the innovation.

The teachings of the present disclosure can be implemented with a feedback loop that includes automatic controls of the laser and the microresonator by a control circuit and/or software. The automated comb generation can be very useful in applications, e.g., generating mode-locked comb and aligning the wavelength with predefined wavelength-division-multiplexing channels.

Figure 12:
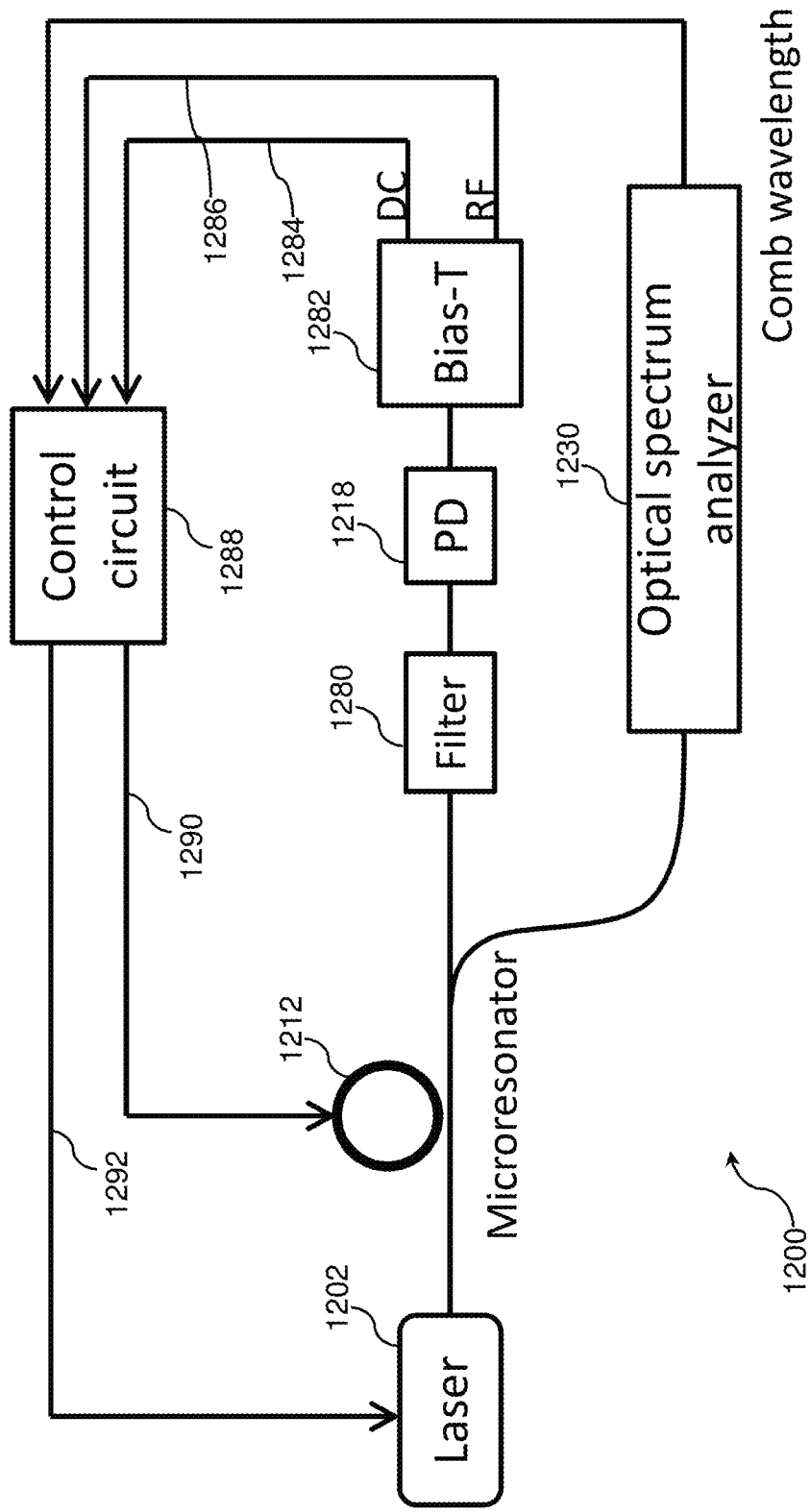
FIG. 12 illustrates a schematic diagram of an automated comb generation system according to one embodiment.

A schematic of an automated comb generation system 1200 is shown in FIG. 12. After the microresonator 1212, an optical filter 1280 is used to select one or multiple comb lines (a bandpass filter), and a photodetector 1218 is used to transduce the power envelope of the selected comb to an electrical signal.

The detected electrical signal is separated to direct current (DC) component and time-varying (RF) component by using a bias-T unit 1282. The DC component 1284 represents the optical power after the microresonator, and can be used to evaluate the frequency detuning between the pump laser and the resonant frequency of the microresonator 1212. The RF component 1286 represents the intensity noise of the comb, and can be used to evaluate the mode-locking state of the comb. If the response frequency of the photodetector 1218 is higher than the comb line spacing, the repetition rate of the time-domain pulse train can also be measured by detecting the beat frequency between the comb lines.

An optical spectrum analyzer 1230 is used to measure the frequencies of each comb line. The DC, RF, and the wavelength information are sent to a control circuit 1288. The control circuit 1288 generates control signals 1290 and 1292 accordingly to control the laser 1202 and microresonator 1212. This feedback loop can also work as a locking loop to stabilize the laser 1202 and microresonator 1212 once a mode-locked comb is generated and need to work for a long time.

Figure 13A:
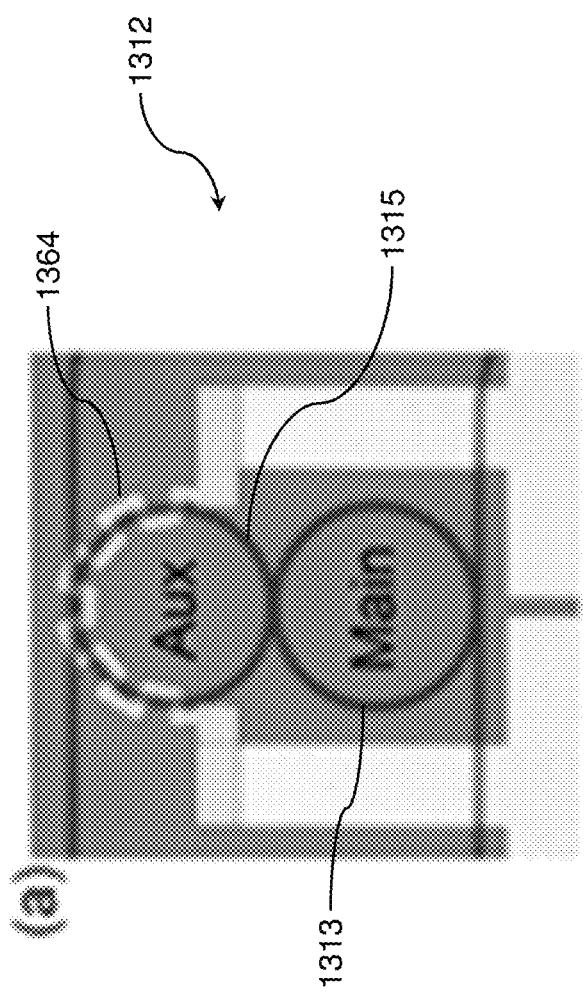
FIG. 13a illustrates a microresonator having a plurality of microrings according to one embodiment.

FIG. 13(a) illustrates a further embodiment, similar to FIG. 1, having a microresonator 1312 with at least two microrings (e.g., a Main microring 1313 and an Auxilliary microring 1315) coupled together. The main ring 1313 and the auxiliary ring 1315 may optionally have slightly different radii. In the illustrated example, the main microring 1313 has a radius of 60 µm and the auxiliary microring 1315 has a radius of 58 µm. Using this arrangement, the coupling occurs between the two microrings, instead of between different modes in a single microring. An "artificial" mode interaction is thus created. The individual microrings may be constructed from single-mode waveguides. This eliminates the sometimes difficult-to-control transverse mode interactions found with single microring arrangements.

Figure 13B:
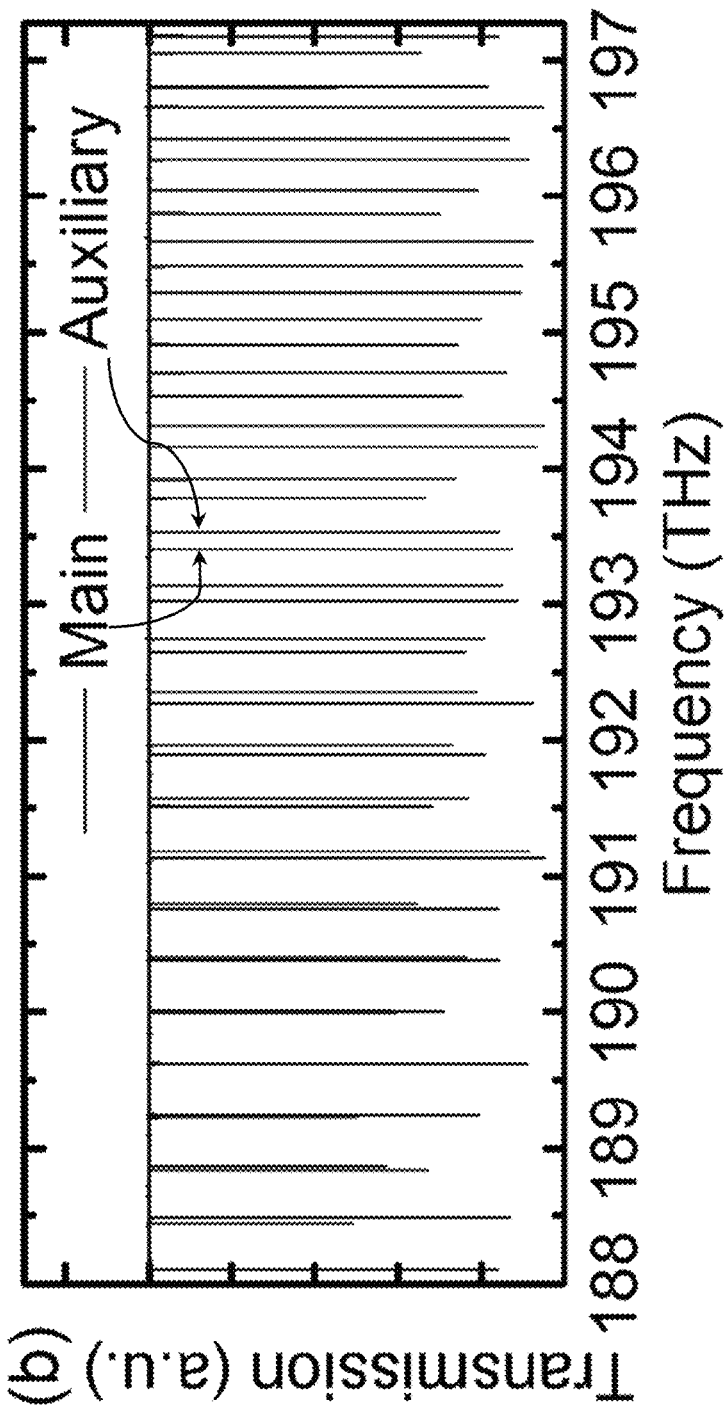
FIG. 13b illustrates the measured transmission of the plurality of microrings of FIG. 13b according to one embodiment.

FIG. 13(b) shows the transmission of the two microrings of FIG. 13(a) measured at their through port respectively. There exists one single transverse mode. The free spectral range (FSR) of the main microring 1313 and the auxiliary microring 1315 is 378 GHz and 391 GHz, respectively.

It shall be understood that in addition to microrings or other structures having different radii, microrings or other structures having identical radii may also be used.

Figure 13C:
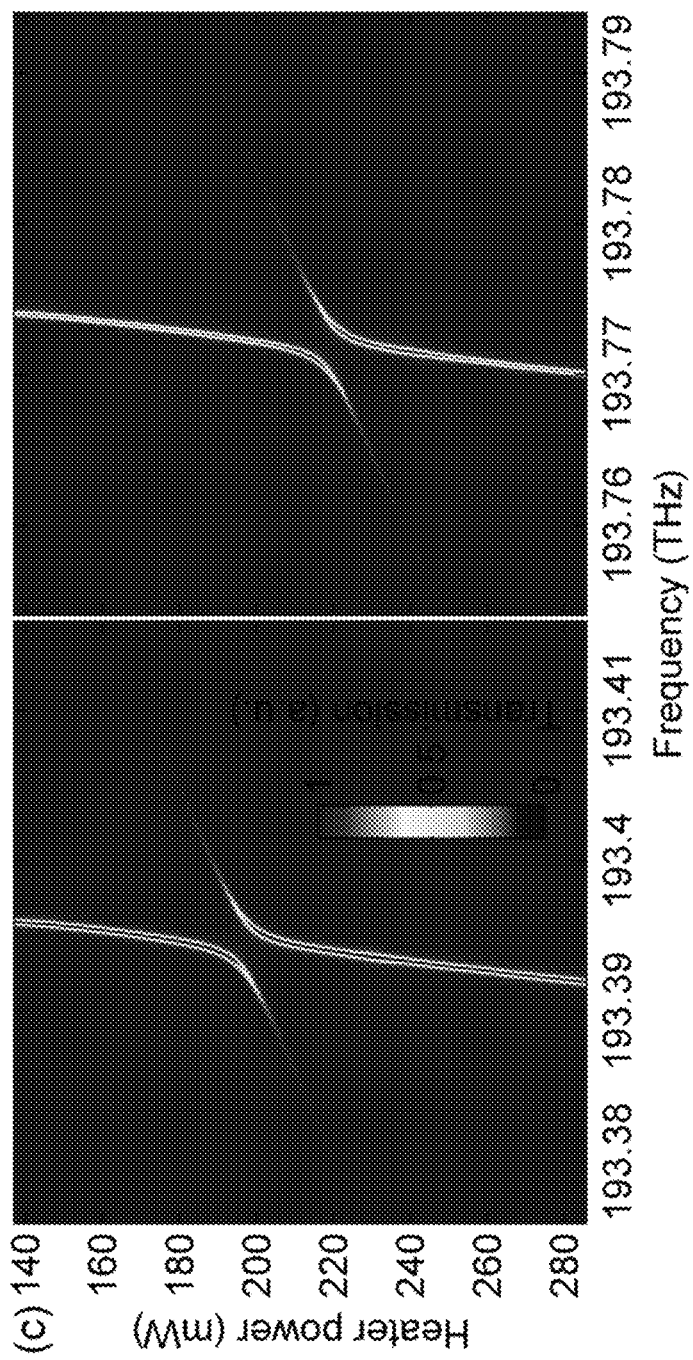
FIG. 13c illustrates transmission of a main microring of FIG. 13a around a mode crossing area.

As also shown in FIG. 13(a), a microheater 1364 is provided on the auxiliary microring 1315. By thermally tuning the auxiliary microring 1315, the mode crossing frequency can be shifted. FIG. 13(c) shows the zoom-in transmission of the main ring around the mode crossing area. By controlling the heater power, the resonances are selectively split. The two new resonance frequencies are shifted compared to the original resonance (i.e., in the absence of splitting). The shifting amounts can be controlled by changing the heater power. At the starting stage of Kerr comb generation, one of the shifted resonances may satisfy the condition that an effective anomalous dispersion is achieved between the shifted resonance, the pumped resonance and the image resonance. Modulational instability thus occurs, enabling primary comb lines to grow. The location of the primary comb line is typically pinned in the mode interaction region.

Figure 14:
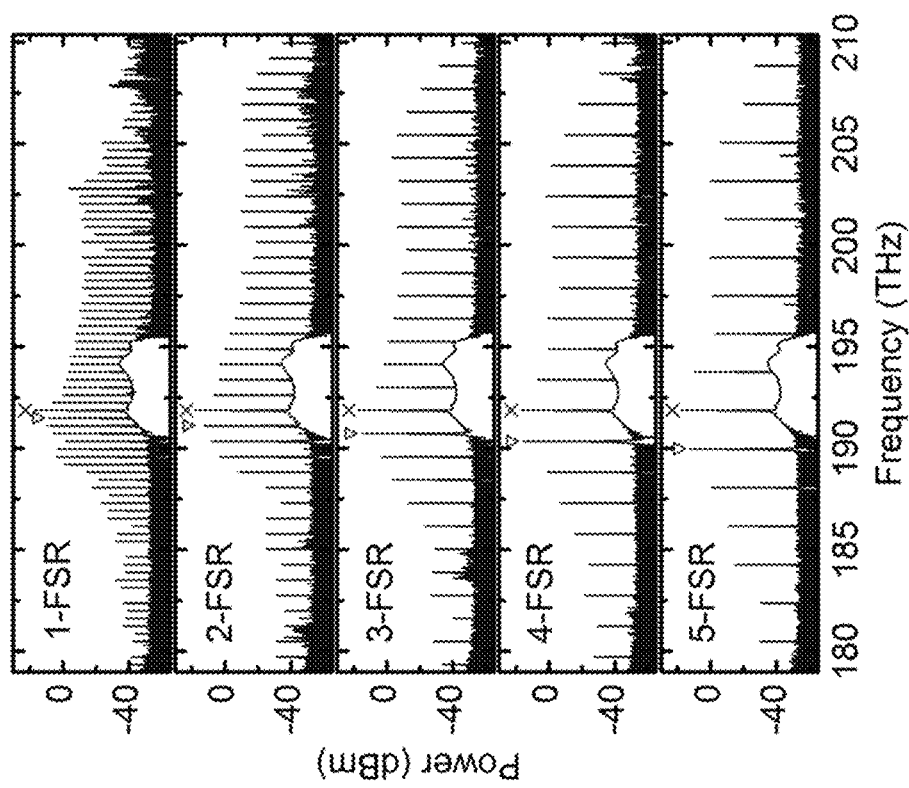

FIG. 14 shows the comb generation results by using the dual coupled microrings of FIG. 13(a). In the example of FIG. 14, the laser 1302 is pumping the resonance at approximately 1562.5 nm with 1 W. By controlling the heater 1364 power, the primary comb lines can be selectively generated at specified resonances, giving rise to a repetition-rate-tunable comb. In this example, the comb repetition rate is tuned from 1-FSR (378 GHz) to 5-FSR (1.89 THz). A similar comb power envelope is maintained in this process. All the combs are intrinsically low-noise. High coherence is thus anticipated.

Figure 15A:
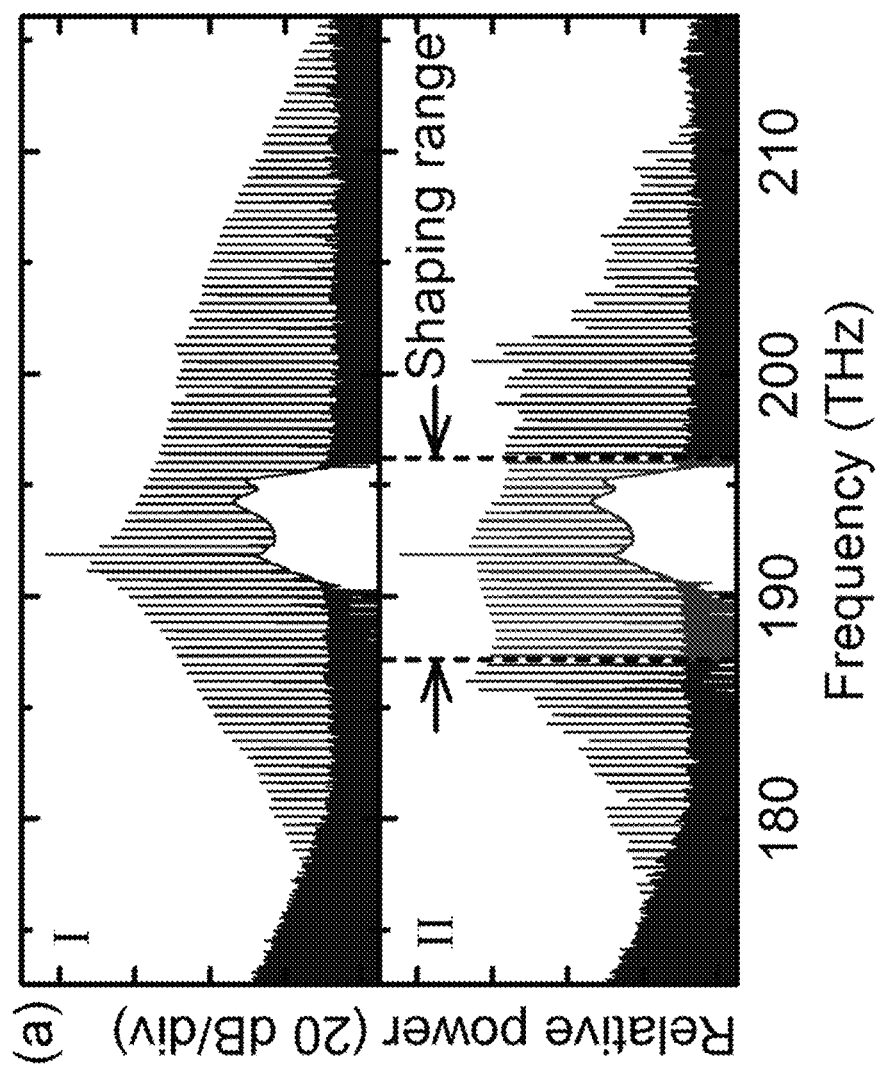
FIG. 15a illustrates comb spectra using the microresonator of FIG. 13a according to one embodiment.
Figure 15B:
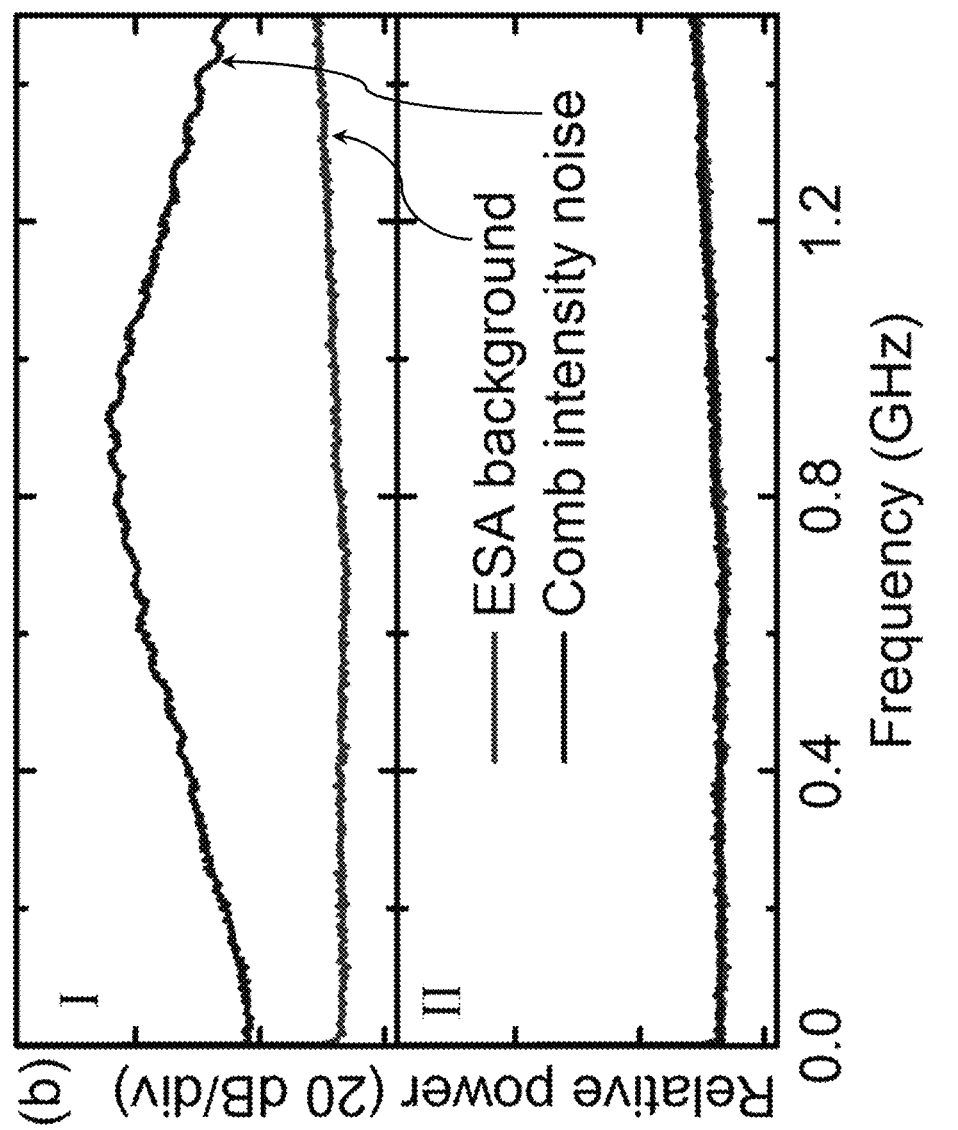
FIG. 15b illustrates intensity noise using the microresonator of FIG. 13a according to one embodiment.
Figure 15C:
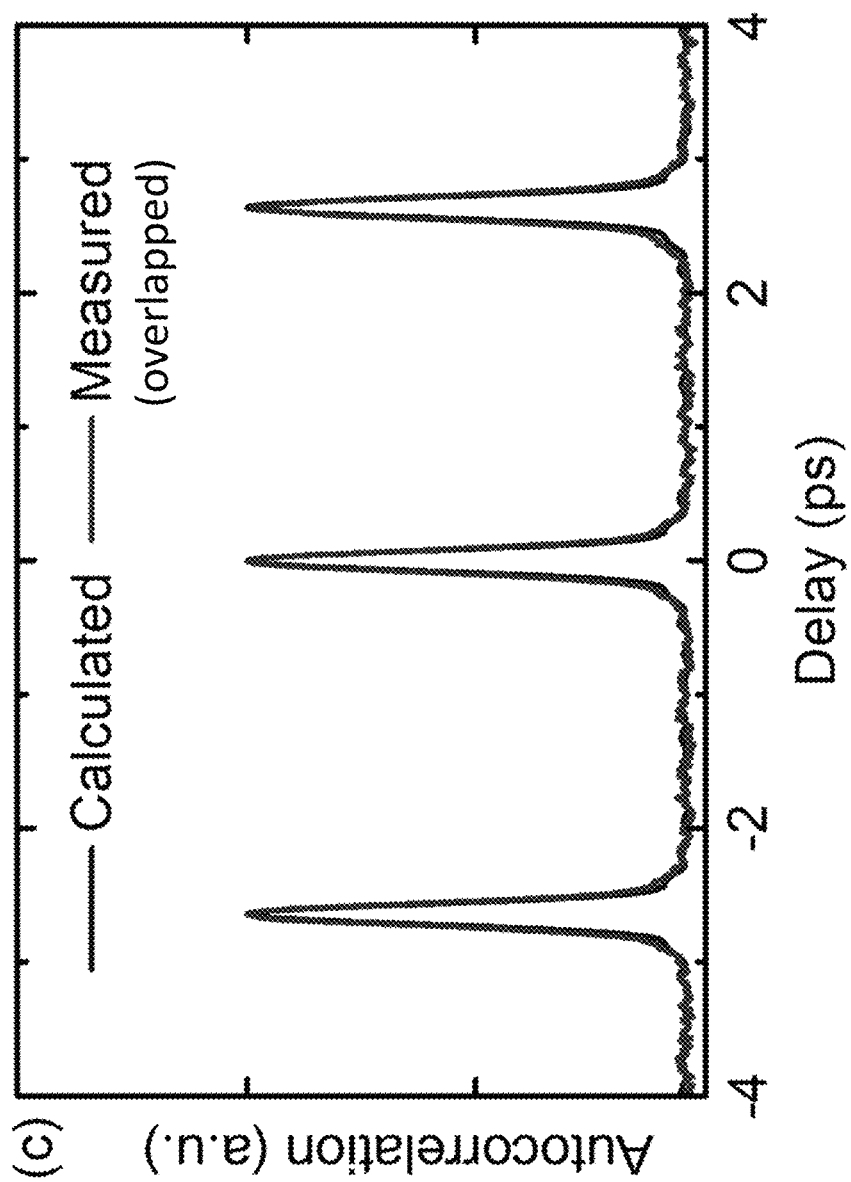
FIG. 15c illustrates calculated and measured results of comb generation using the microresonator of FIG. 13a according to one embodiment.

Using the dual microring arrangement of FIG. 13, mode locking transitions in which the comb first shows high intensity noise and then transitions to a low-noise state are achievable. FIGS. 15(a)-15(c) illustrate one example. In the example of FIG. 15(a)-(c), the pump power is 1.8 W. A broadband comb with high intensity noise is observed. The comb spectrum and intensity noise at this stage are shown in FIG. 15(a) I and FIG. 15(b) I, respectively. By optimizing the heater power, the noisy comb suddenly transitions to a low-noise state. The comb spectrum and intensity noise after transition are shown in FIG. 15(a) II and FIG. 15(b) II, respectively. The mode-locked comb is relatively broad with a 10-dB bandwidth of around 120 nm. To further verify the mode-locked state of the comb, a fraction of the comb spectrum is selected and phase compensated line-by-line by using a pulse shaper in the lightwave C+L band. A transform-limited pulse is obtained (autocorrelation width 200 fs, corresponding to ~130-fs pulse width), suggesting very high coherence.

It shall be appreciated that in addition to microrings, other microresonator shapes may be used to implement the above system and method including, but not limited to, toroids, spheres, cylinders, and the like.

Those skilled in the art will recognize that numerous modifications can be made to the specific implementations described above. The implementations should not be limited to the particular limitations described. Other implementations may be possible.

What is claimed is:

1. A tunable optical comb generator, comprising:
a source laser configured to generate a continuous wave (CW) light at a first wavelength;
a microresonator coupled to the source laser, configured to receive the CW light and generate an optical comb signal having a plurality of output wavelengths corresponding to the first wavelength;
a microresonator tuning device coupled to the microresonator and configured to tune resonant frequencies of the microresonator; and
a control circuit coupled to the microresonator tuning device and configured to generate a control signal to control the microresonator tuning;
wherein the comb signal spectrum is shifted after the comb signal is generated and has reached a mode-locked state, with the control circuit further configured to control the source laser to adjust the first wavelength and to control the microresonator to adjust the resonant wavelength in a synchronized fashion, wherein the mode-locked state of the comb signal is maintained as the comb signal is shifted.

2. The tunable optical comb generator of claim 1, the microresonator tuning device comprises a heater.

3. The tunable optical comb generator of claim 2, wherein comb mode locking is achieved by keeping the first wavelength of the source laser fixed and the adjusting the control signal to cause the microresonator resonance to first shift to a second wavelength longer than the first wavelength and then shift back to the first wavelength.

4. The tunable optical comb generator of claim 3, the microresonator comprising silicon nitride.

5. The tunable optical comb generator of claim 1, the microresonator tuning device comprises at least one microring.

6. The tunable optical comb generator of claim 1, wherein the control signal causes the microresonator resonance to first shift to a second wavelength longer than the first wavelength and then shift back to the first wavelength.

7. The tunable optical comb generator of claim 1, wherein comb mode locking is achieved by keeping the first wavelength of the source laser fixed and adjusting the control signal to cause the microresonator resonance to first shift to a second wavelength longer than the first wavelength and then shift back to the first wavelength.

8. The tunable optical comb generator of claim 1, the microresonator comprising silicon nitride.

9. The tunable optical comb generator of claim 1, wherein the spectrum of the comb signal is continuously tuned.

10. The tunable optical comb generator of claim 9, wherein the comb signal maintains high coherence while being tuned.

11. A tunable optical comb generator, comprising:
a source laser configured to generate a continuous wave (CW) light at a first wavelength;
a microresonator system coupled to the source laser and having a plurality of microresonators coupled together, the microresonators configured to receive the CW light and generate an optical signal having a plurality of output wavelengths corresponding to the first wavelength, each of the microresonators comprising a microring;
a microresonator tuning device coupled to the microresonator system and configured to tune the microresonator system; and
a control circuit coupled to the microresonator tuning device and configured to generate a control signal to control the microresonator tuning device;
wherein the resonances of the plurality of microresonators coupled together are selectively split; and
wherein at least one of the selectively split resonances satisfies a condition of effective anomalous dispersion.

12. The tunable optical comb generator of claim 11, the microresonator tuning device comprises a heater.

13. The tunable optical comb generator of claim 11, plurality of microresonators comprising:
a. a first microring having a first radius; and
b. a second microring having a second radius different than the first radius.

14. The tunable optical comb generator of claim 11, plurality of microresonators comprising:
a. a first microring having a first free spectral range; and b. a second microring having a second free spectral range different than the first free spectral range.

15. The tunable optical comb generator of claim 14, the microresonator tuning device further comprising a heater.

16. The tunable optical comb generator of claim 15, the heater operatively coupled to the first microring.

17. The tunable optical comb generator of claim 16, the microresonators comprising silicon nitride.

18. The tunable optical comb generator of claim 11, the microresonators comprising silicon nitride.

19. The tunable optical comb generator of claim 11, wherein the microrings of the plurality of microresonators are constructed from single-mode waveguides.

20. The tunable optical comb generator of claim 11, wherein the microresonator tuning device is configured to tune the microresonator system to compensate the microresonator system for wavelength shifts.

21. The tunable optical comb generator of claim 20, wherein the control circuit is configured to generate the control signal to control the microresonator tuning device based on the optical signal.

22. The tunable optical comb generator of claim 11, wherein the coupling between the plurality of microresonators results in an artificial mode interaction.

23. The tunable optical comb generator of claim 11, wherein the microresonator tuning device changes the coupling of the plurality of microresonators by tuning an alignment of their resonant frequencies.

24. The tunable optical comb generator of claim 11, wherein at least one of the plurality of microresonators has a normal resonator dispersion.

* * * * *